United States Patent [19]
Machida et al.

[11] Patent Number: 5,494,881
[45] Date of Patent: Feb. 27, 1996

[54] CERAMIC HONEYCOMB STRUCTURAL BODY AND CATALYST COMPRISING THE SAME

[75] Inventors: Minoru Machida; Toshio Yamada; Yukihito Ichikawa, all of Nagoya, Japan

[73] Assignee: NGK Insulators, Ltd., Japan

[21] Appl. No.: 216,429

[22] Filed: Mar. 23, 1994

[30] Foreign Application Priority Data

Jul. 29, 1993 [JP] Japan .................................. 5-188273
Jul. 29, 1993 [JP] Japan .................................. 5-188274

[51] Int. Cl.⁶ .................................................. B01J 35/00
[52] U.S. Cl. ...................... 502/439; 502/527; 423/213.2
[58] Field of Search .................................. 502/439, 527; 423/213.2

[56] References Cited

U.S. PATENT DOCUMENTS

| | | | |
|---|---|---|---|
| 4,695,301 | 9/1987 | Okajima et al. | 502/527 |
| 4,740,408 | 4/1988 | Mochida et al. | 502/527 |
| 4,955,524 | 9/1990 | Way . | |

FOREIGN PATENT DOCUMENTS 0241269  10/1987  European Pat. Off. .

OTHER PUBLICATIONS

Reduction of Wall Thickness of Ceramic Substrates for Automotive Catalysts, Hiroaki Yamamoto et al., International Congress and Exposition, Detroit, Michigan, Feb. 26–Mar. 2, 1990, SAE Technical Paper Series 900614.
Warm–Up Characteristics of Thin Wall Honeycomb Catalysts, Hiroaki Yamamoto et al., International Congress and Exposition Detroit, Michigan, Feb. 25–Mar. 1, 1991, SAE Technical Paper Series 910611.
Development of a High Performance Catalytic Converter for a Turbocharged Gasoline Engine Using Thin Wall Ceramic Technology, Iain Sword et al., International Congress and Exposition, Detroit, Michigan, Mar. 1–5, 1993, SAE Technical Paper Series 930943.
JASO M507–87. (1987).
Corning Brochure, Celcor Honeycomb Catalyst Supports, Setting the Standard for Automotive Converter Substrate Technology. (Feb. 1991).
Ceramic HOneycombs in the Spotlight (Ceramic Honeycomb Supports for Deodorizing Catalysts), NGK Insulators, Ltd. (Mar. 1984).
Development of Notal–supported Catalyst, Kohji Masuda et al., Nissan Motor Technical Bulletin, pp. 62–68. (Dec. 1988).

*Primary Examiner*—Anthony McFarlane
*Attorney, Agent, or Firm*—Parkhurst Wendel & Rossi

[57] ABSTRACT

A ceramic honeycomb catalyst includes a thin-walled honeycomb structural body (10) and a catalytic substance carried by the honeycomb structural body (10). The honeycomb structural body (10) has a number of longitudinally extending flow passages (13) defined by an outer peripheral wall (11) and partition walls (12) with a reduced thickness (t). The honeycomb structural body (10) satisfies particular relationships between the partition wall thickness (t) and the open frontal area (OFA) or bulk density (G). Notwithstanding the thin-walled partition walls, the honeycomb structural body (10) has practically satisfactory compressive strength characteristics. The catalyst comprising the honeycomb structural body (10) has reduced pressure loss and heat capacity.

24 Claims, 27 Drawing Sheets

FIG_1
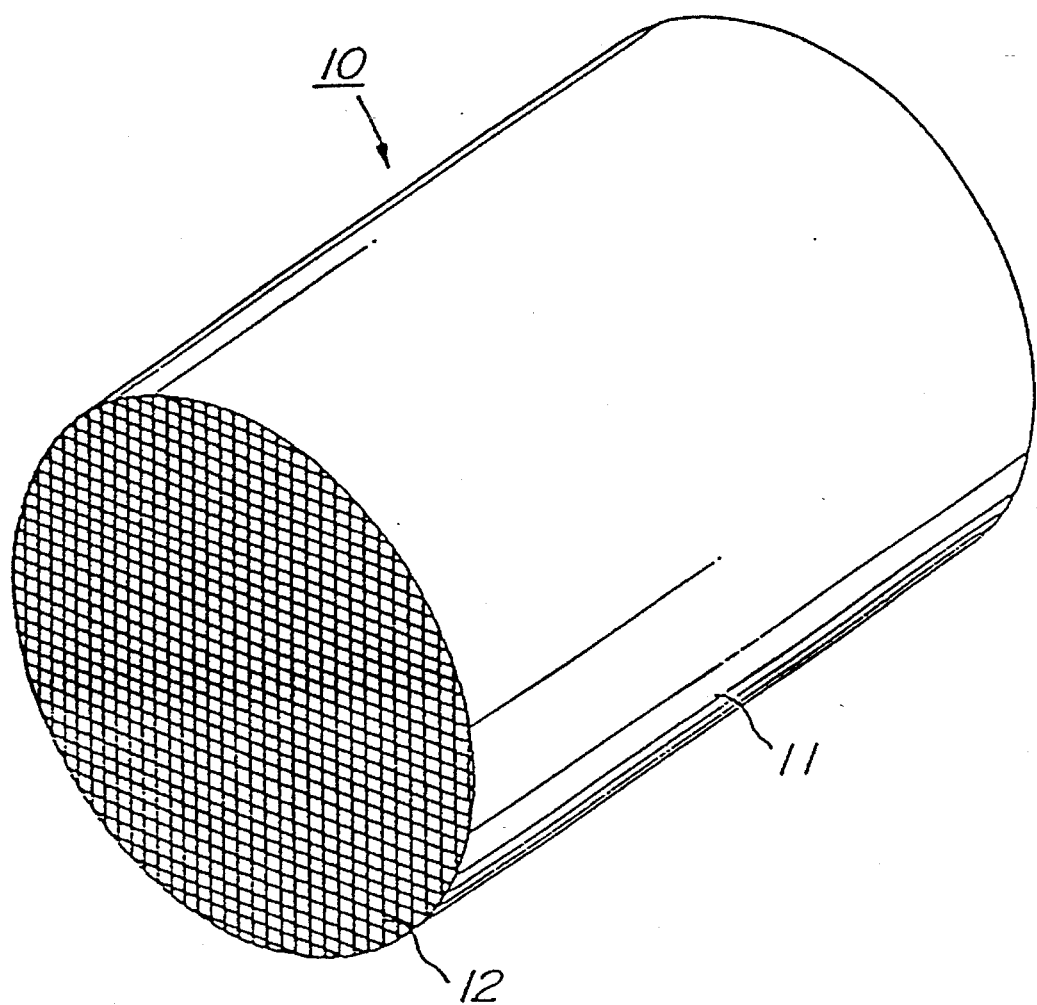
FIG_2
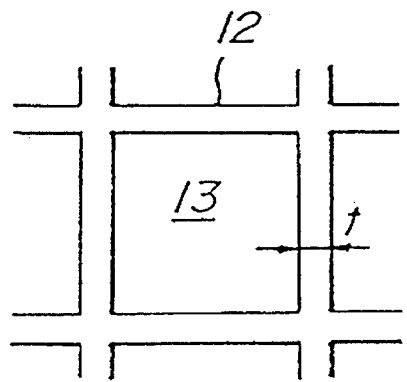

FIG_3
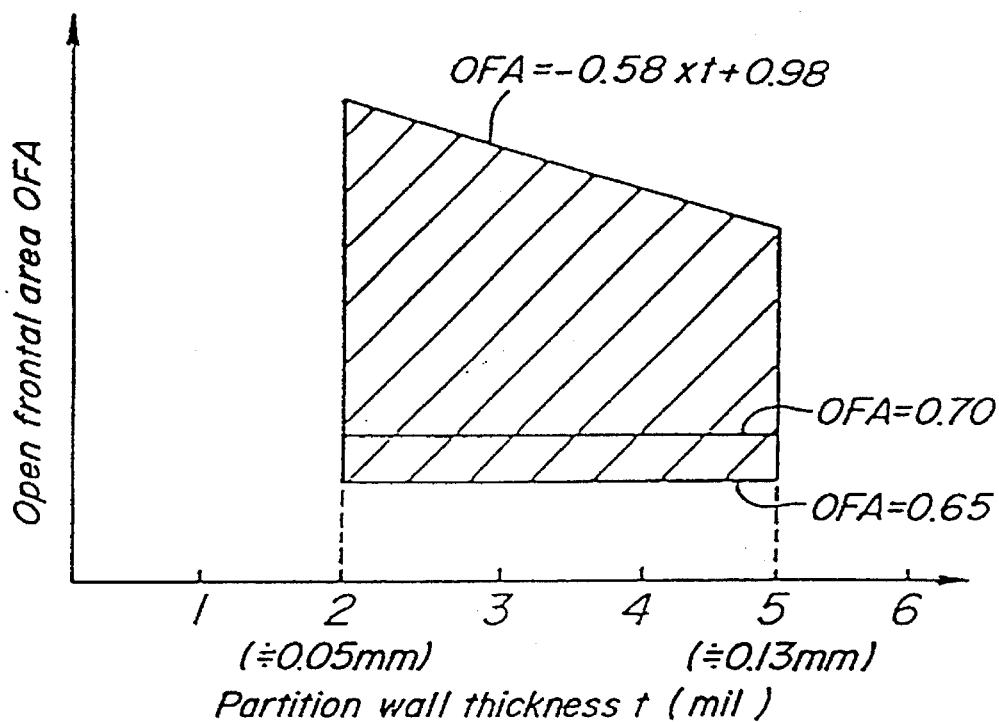
FIG_4
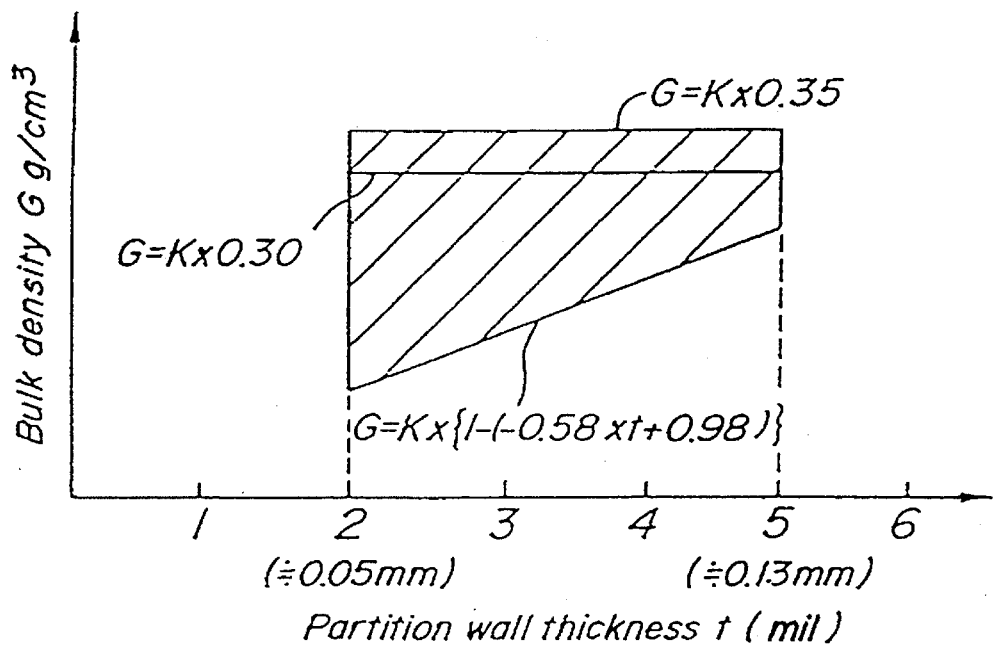

FIG_5
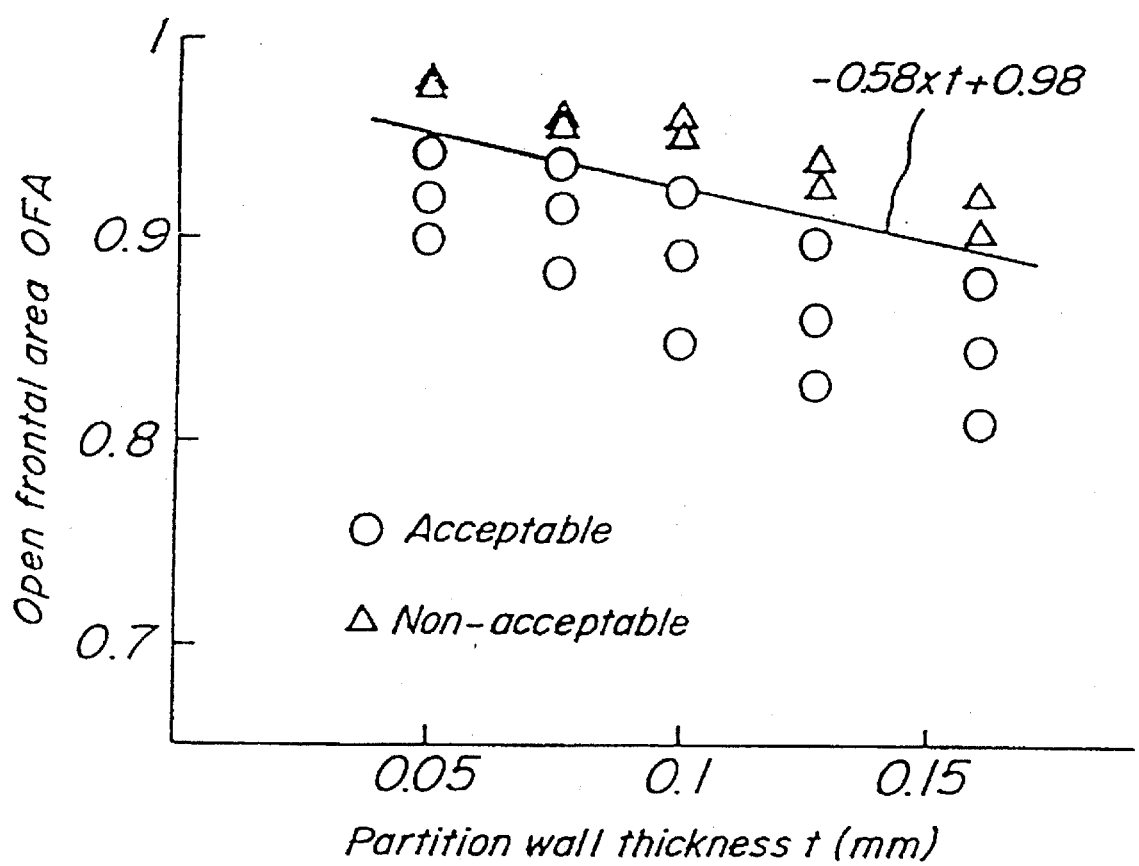

FIG_6A
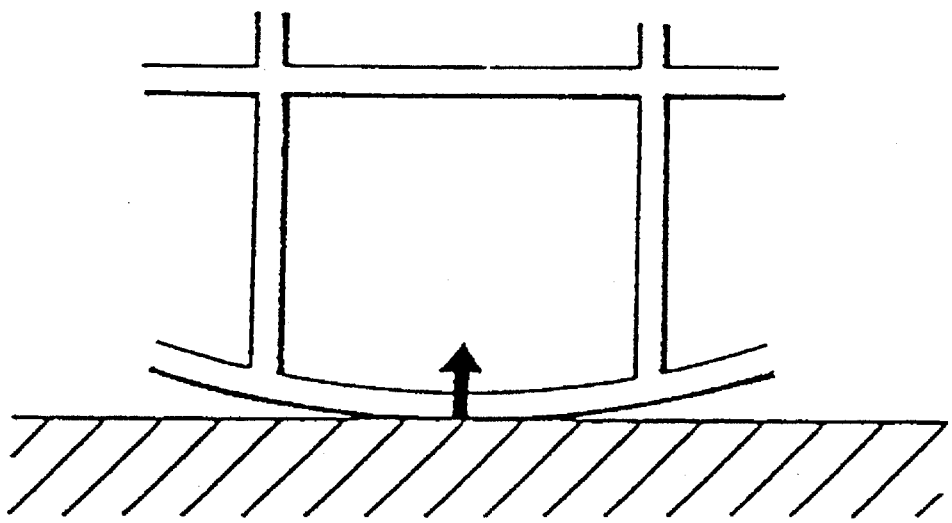
FIG_6B
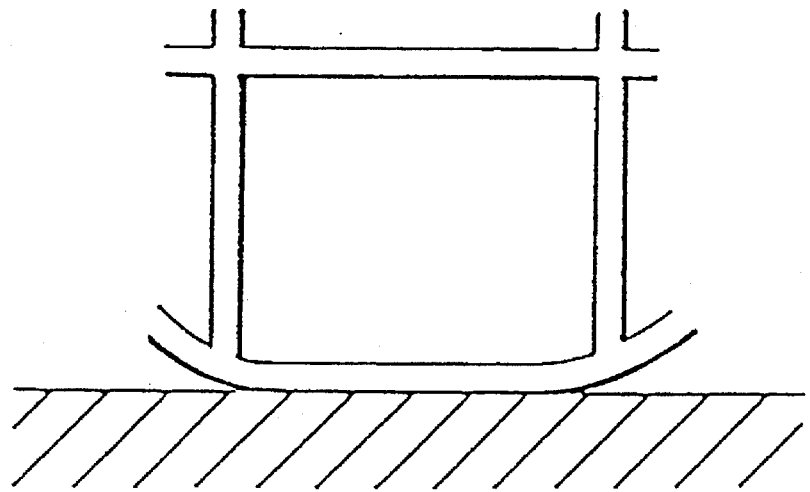

FIG_8

FIG_9

FIG_10

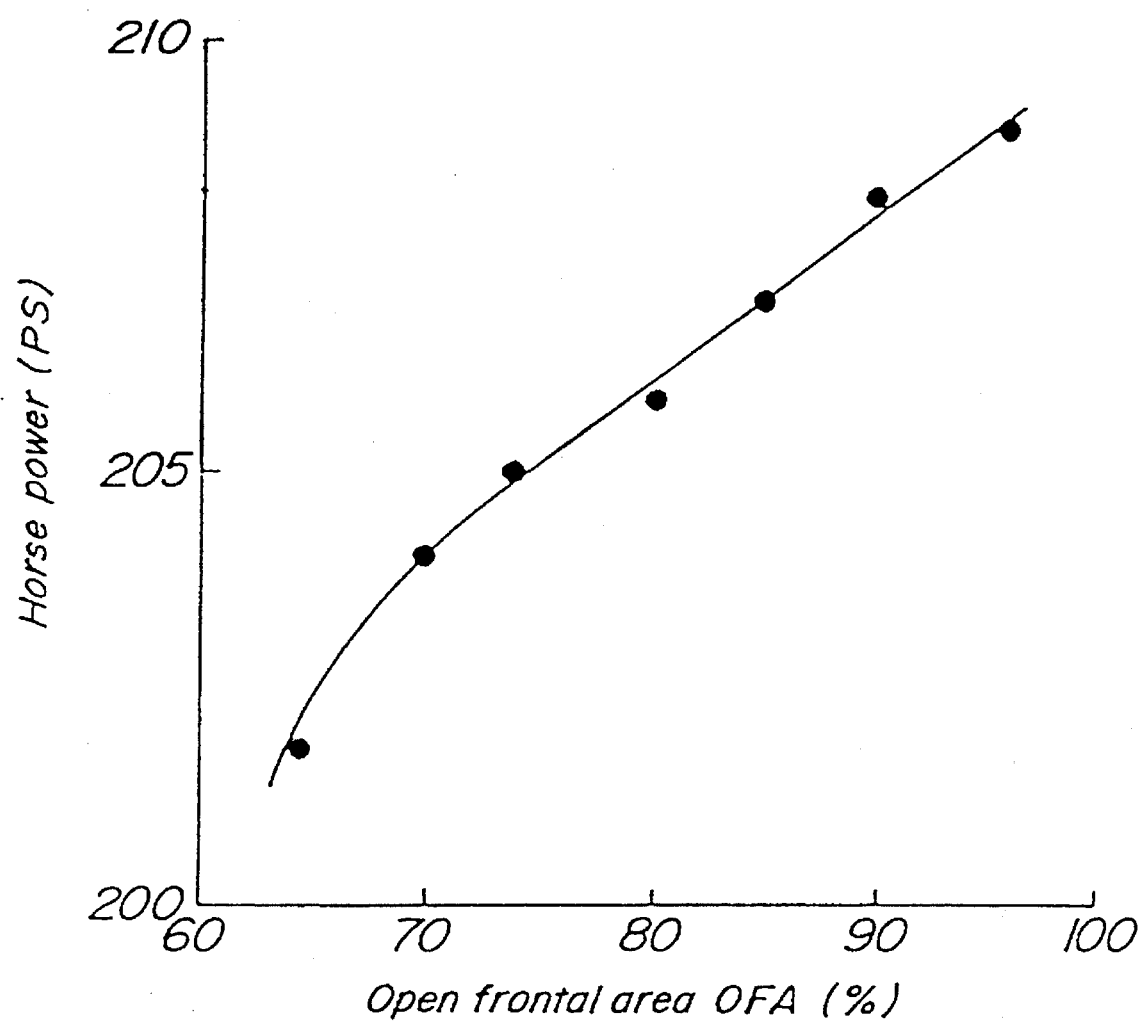
FIG_12

FIG_13A
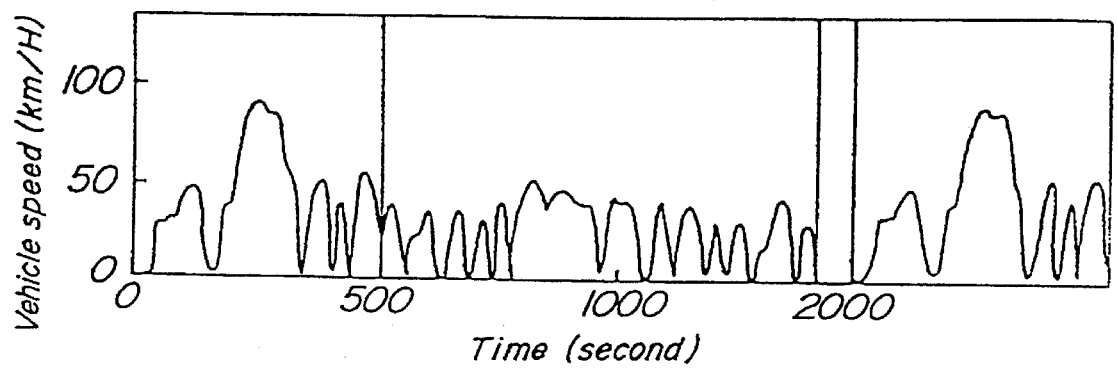
FIG_13B
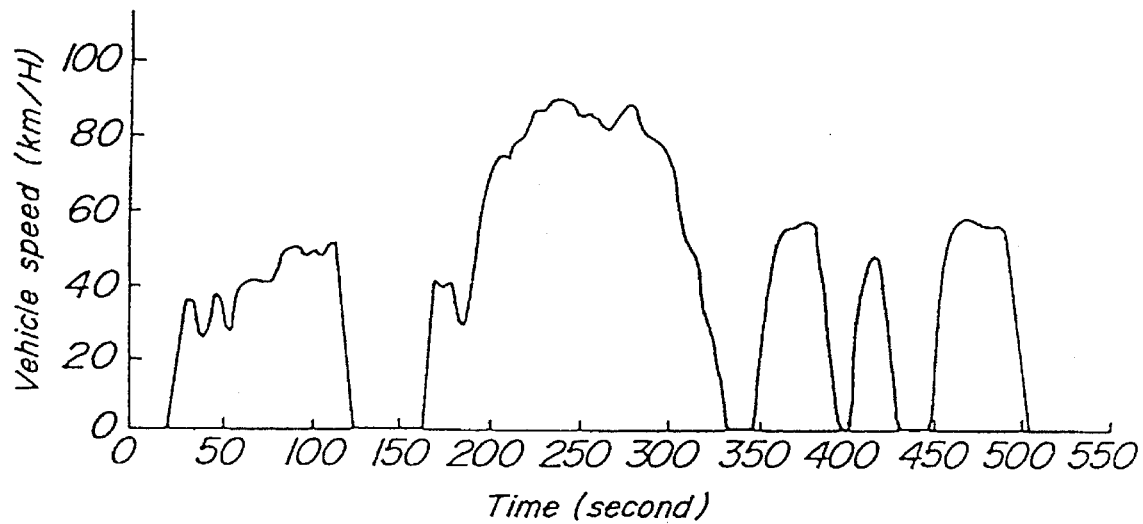

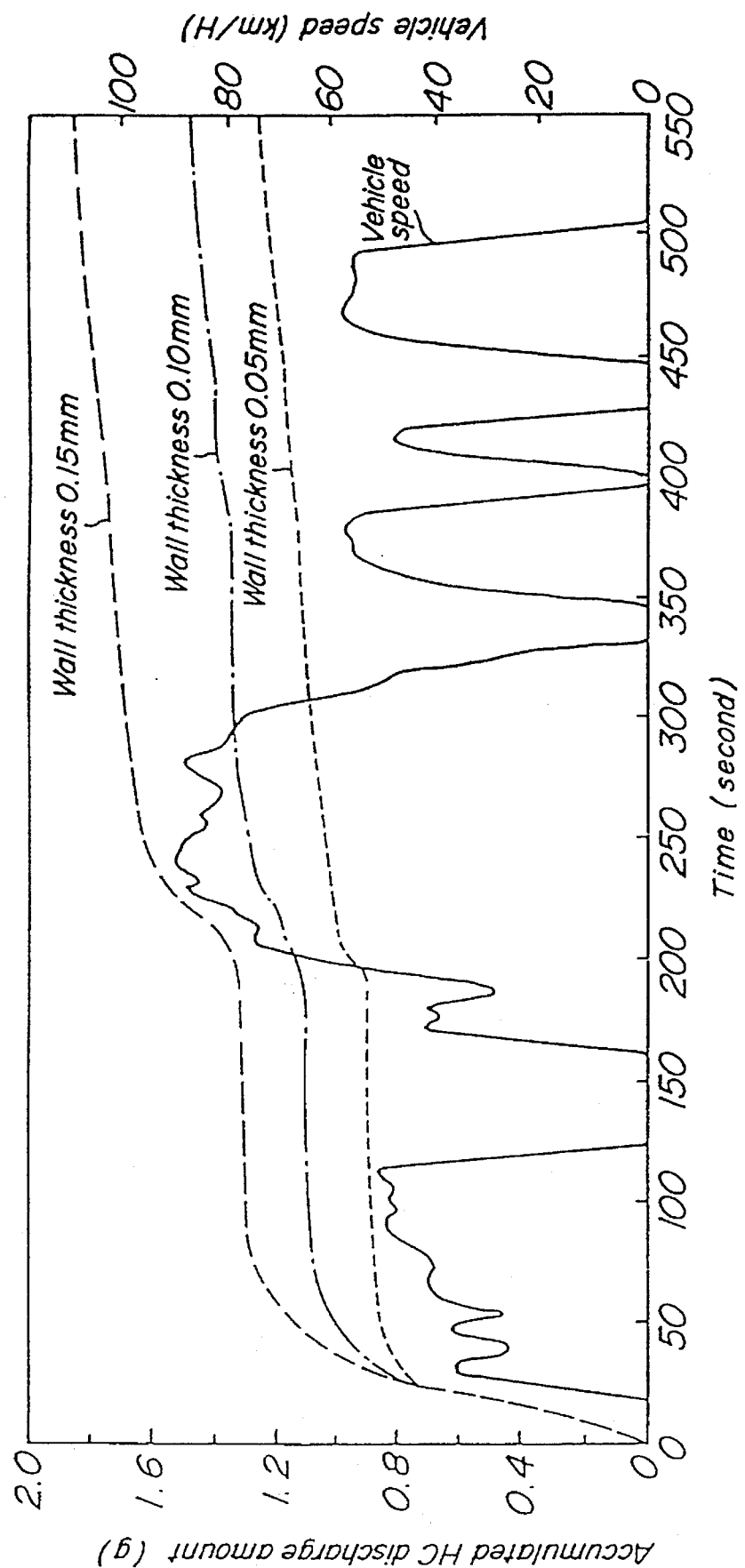

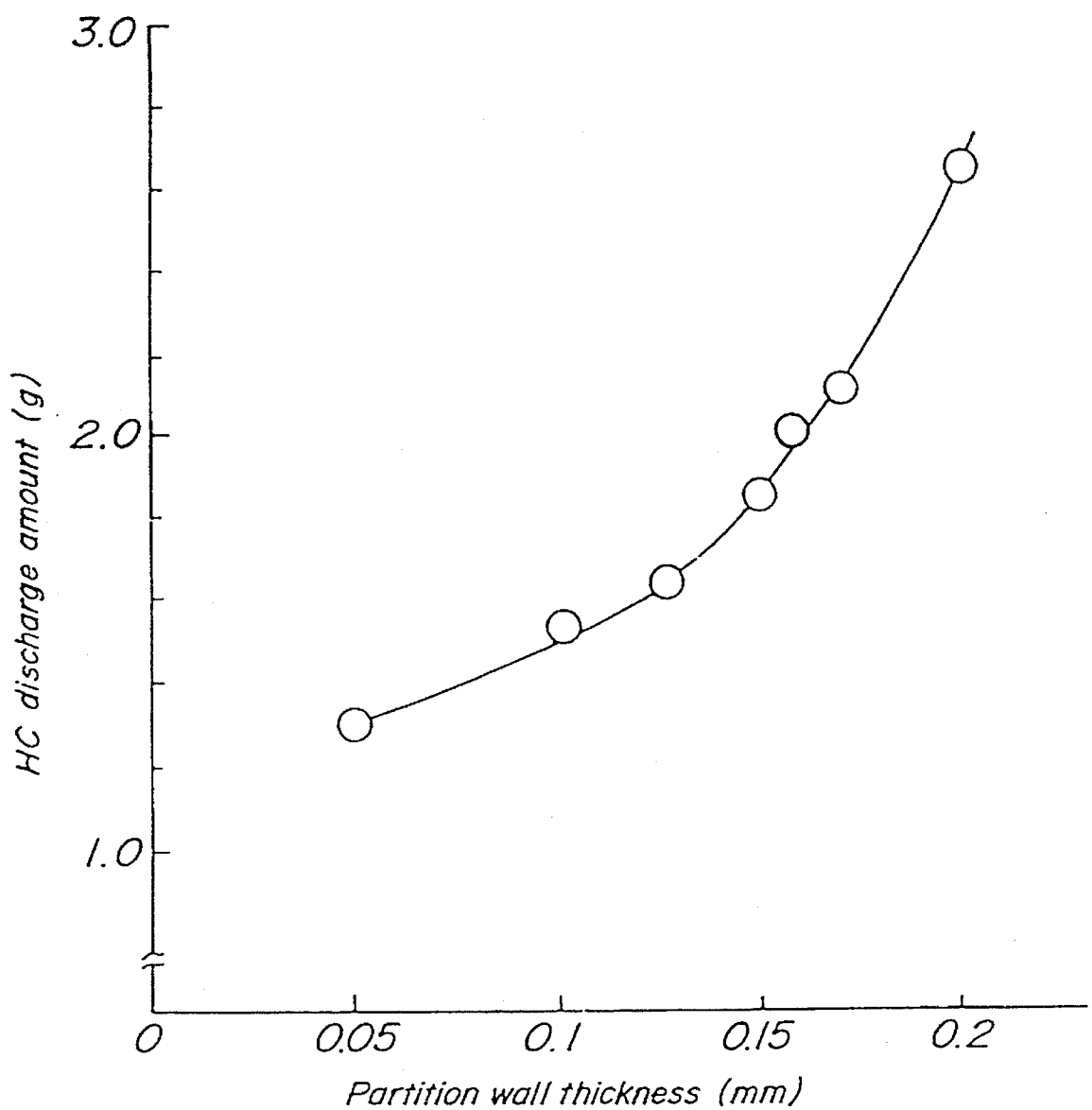
FIG_15

FIG_16
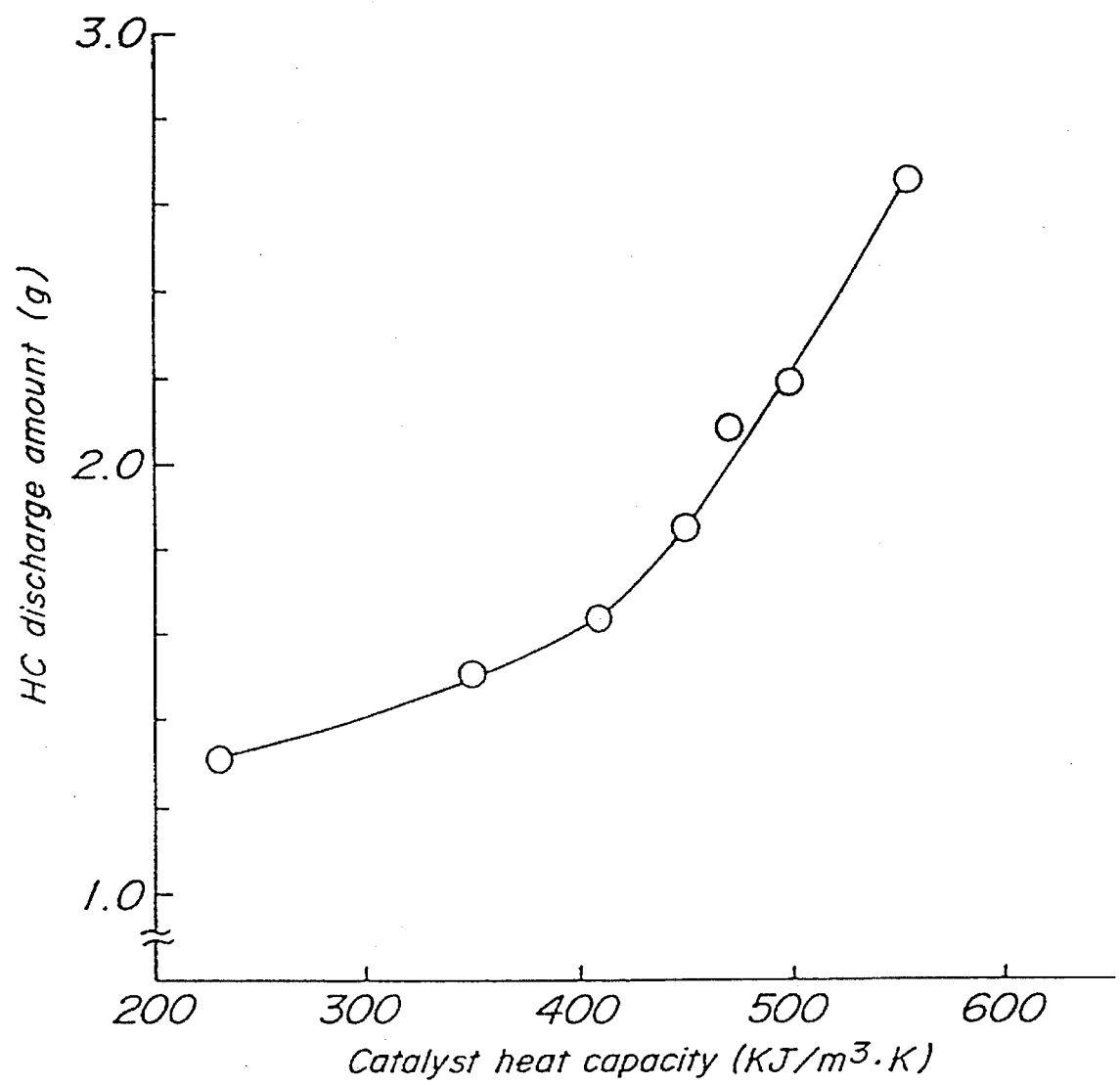

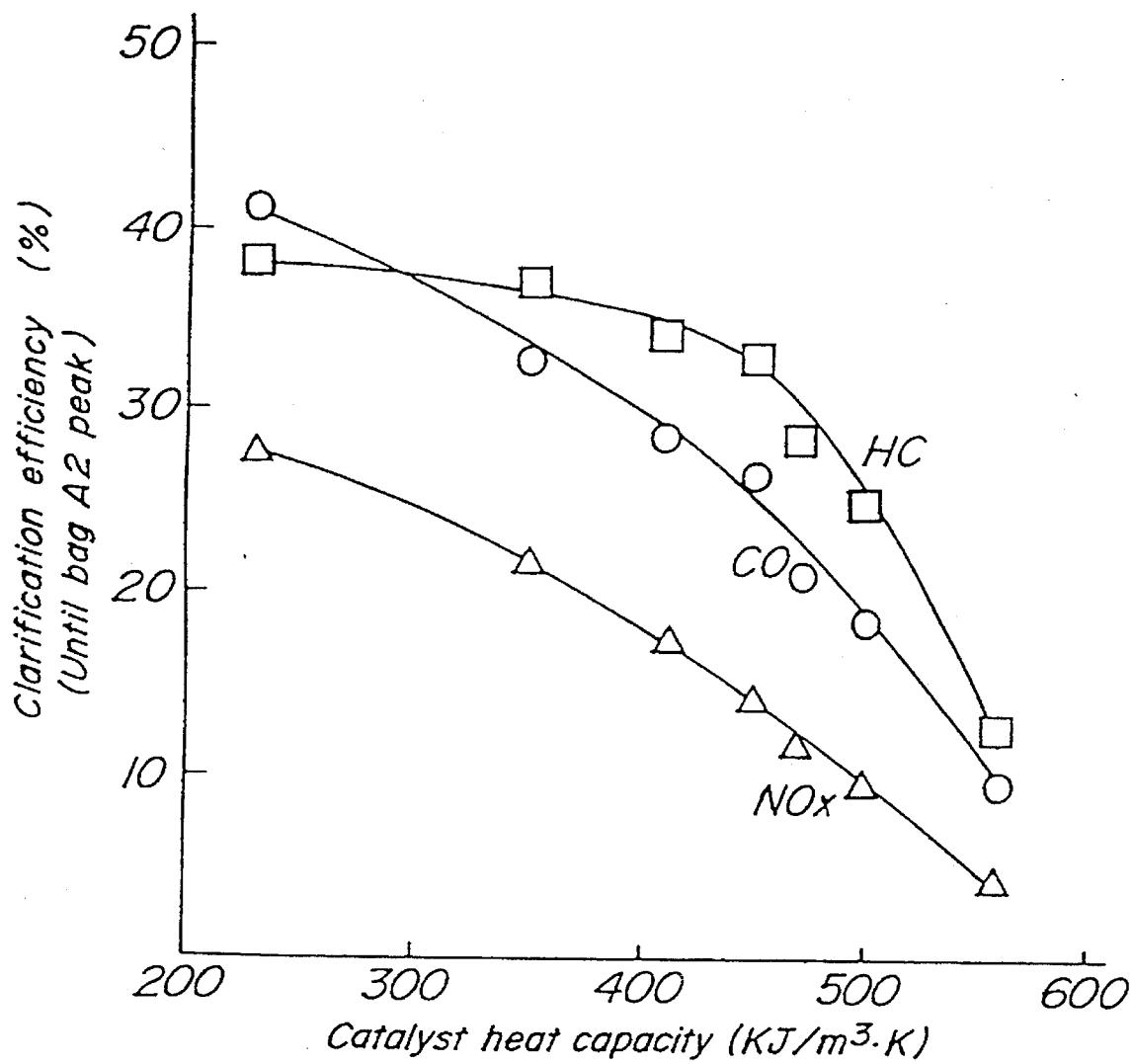
FIG_17

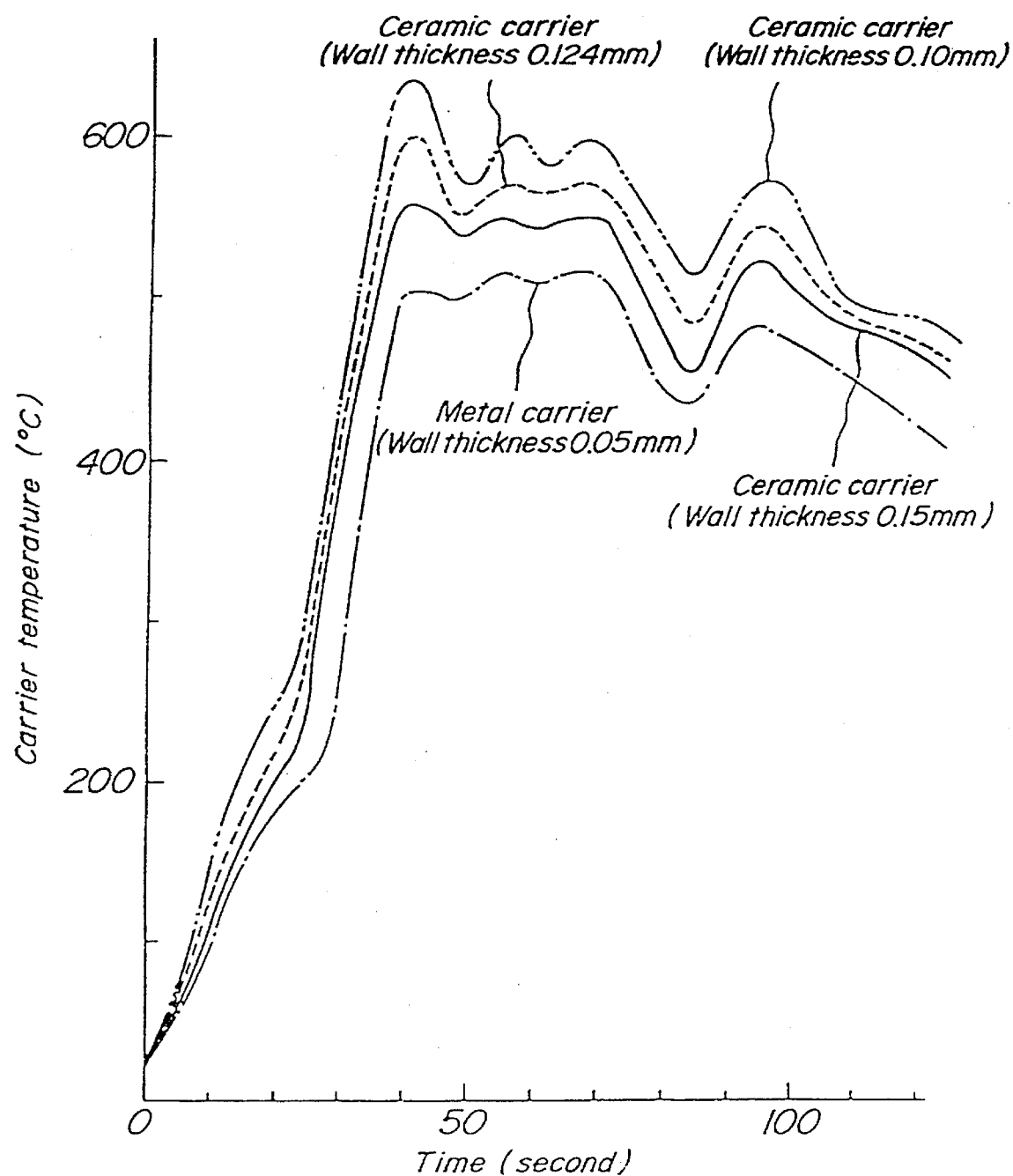
FIG_18

FIG_20
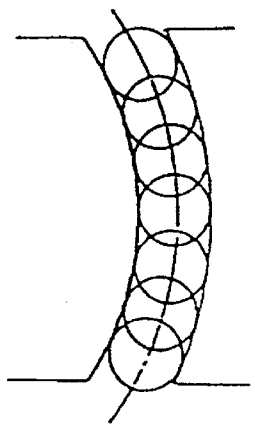
FIG_21A
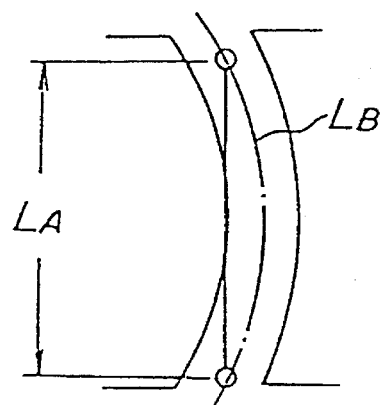
$1 \leq L_B/L_A \leq 1.10$
FIG_21B
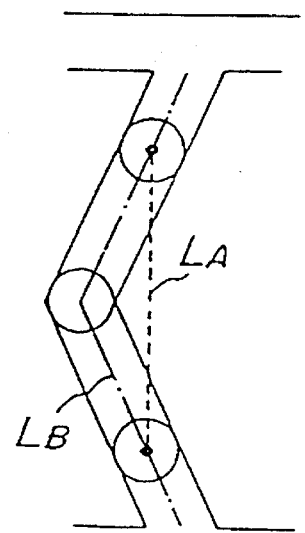
FIG_21C
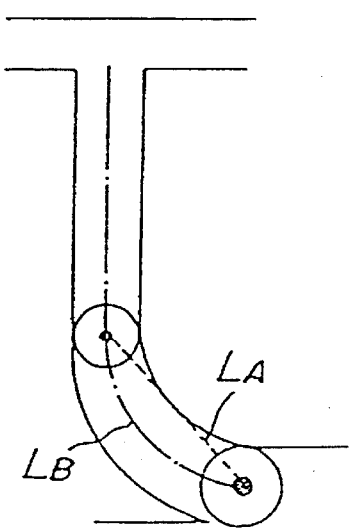

FIG_22
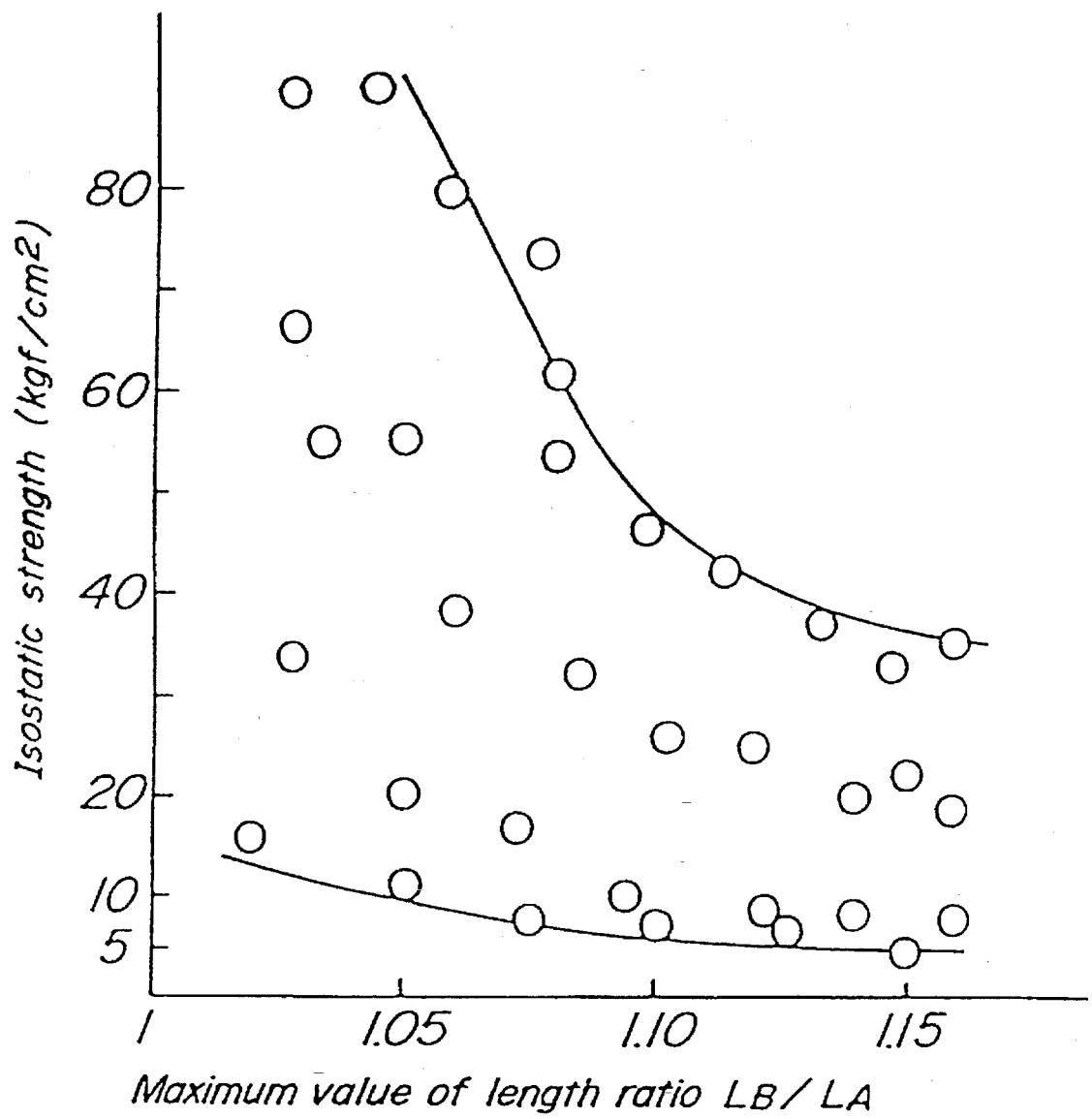

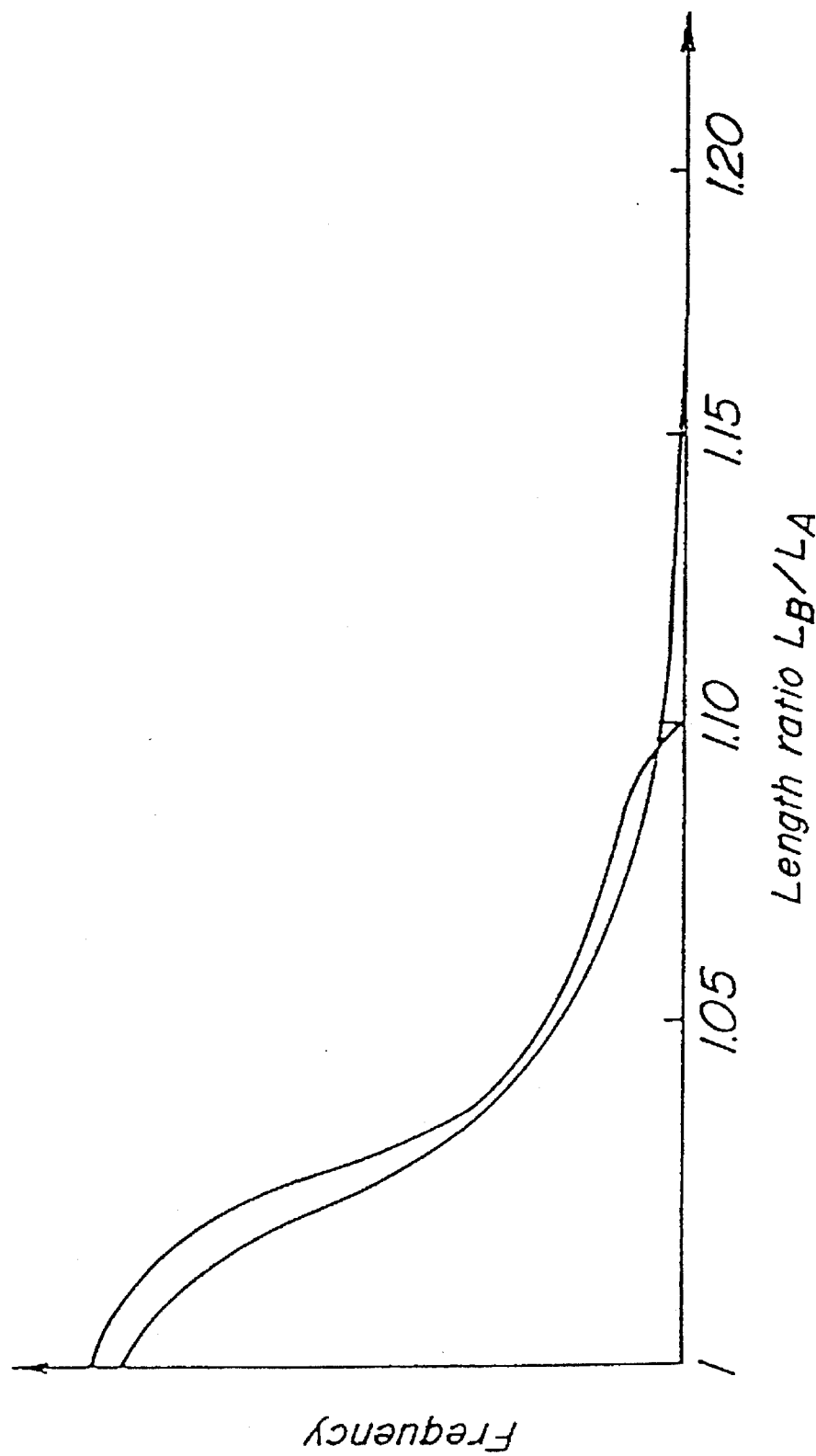
FIG._23

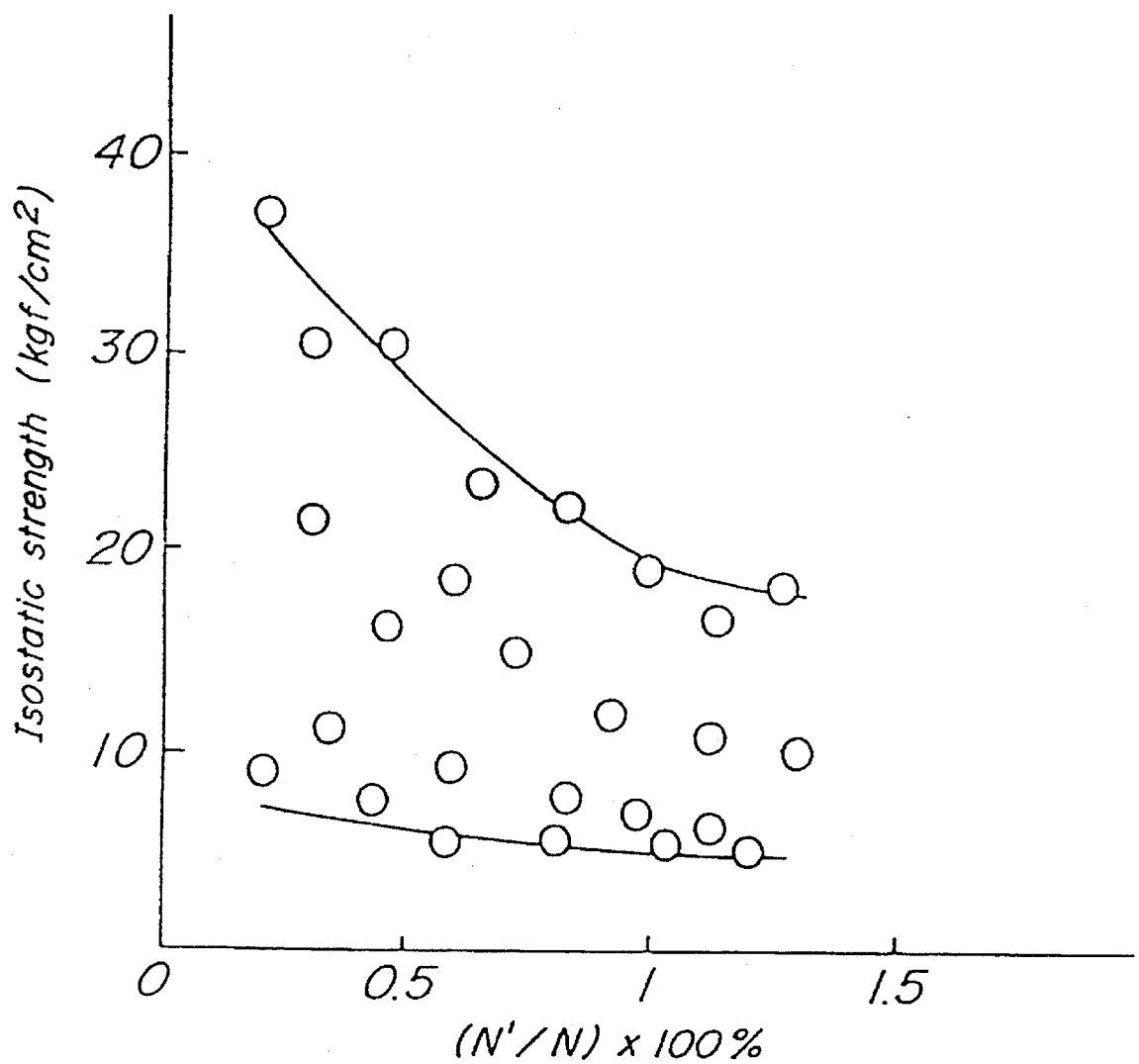
FIG_24

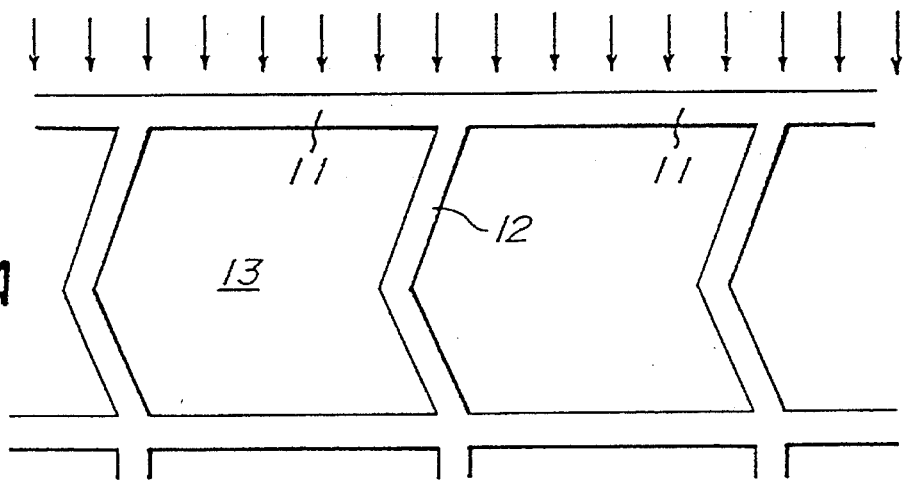
FIG._25A
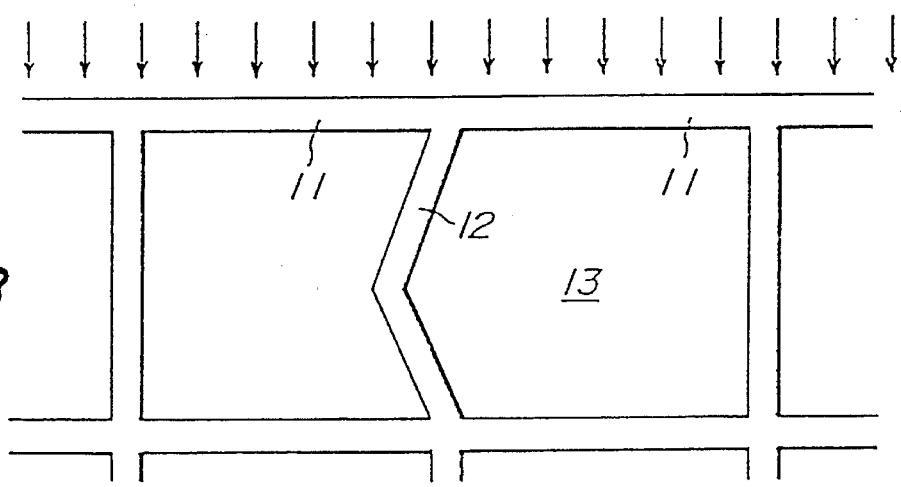
FIG._25B

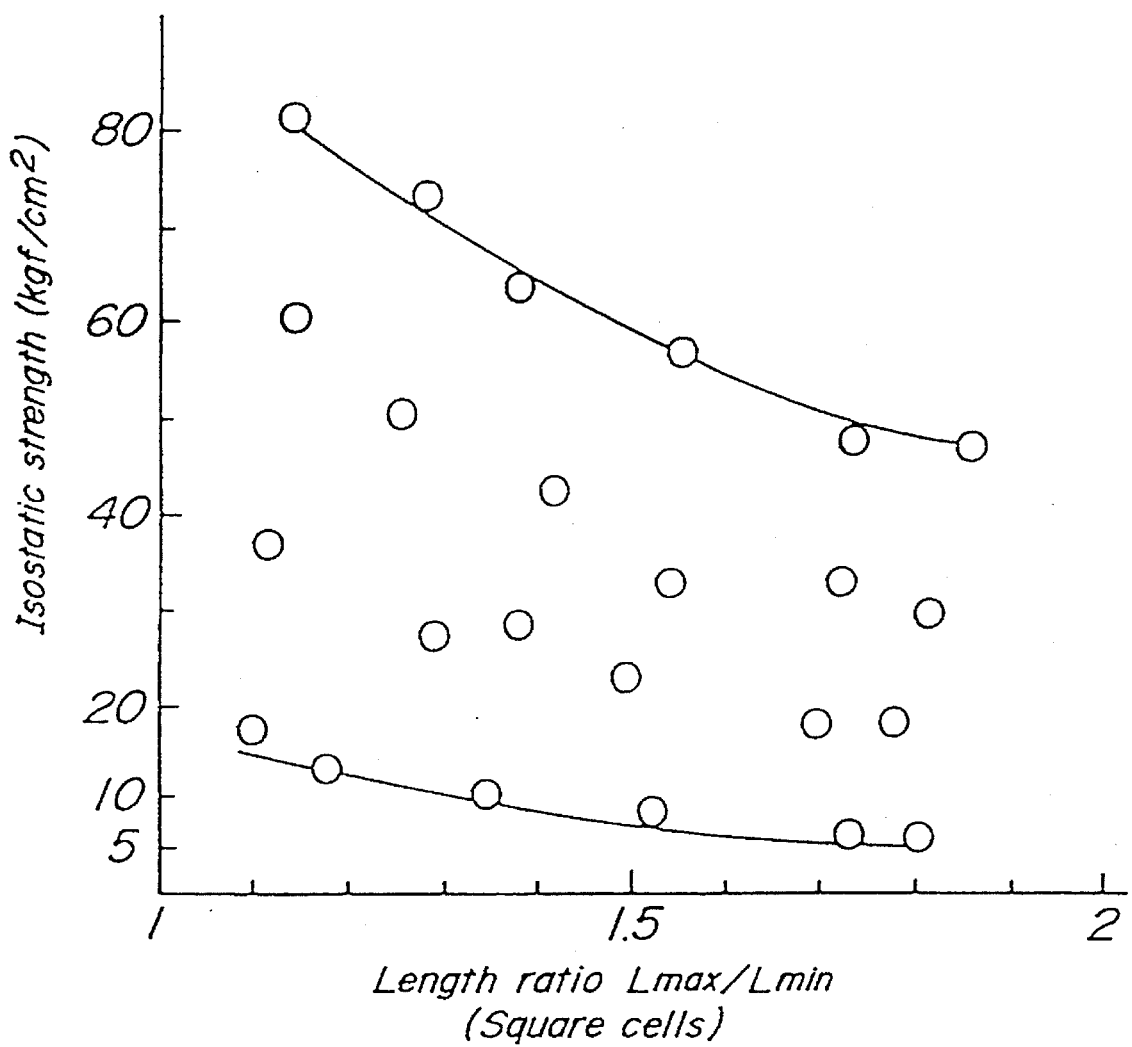
FIG_28

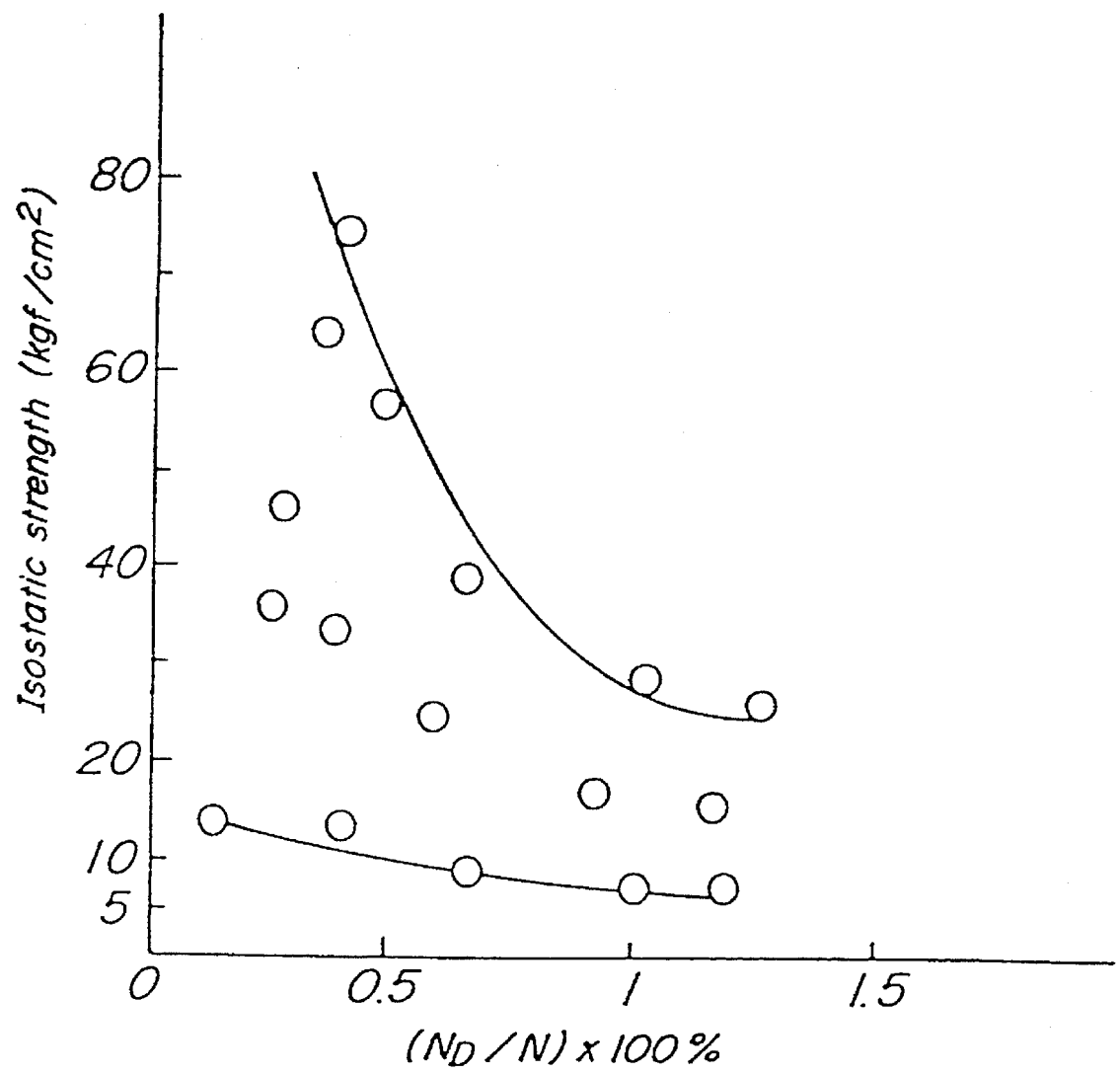
FIG_31

CERAMIC HONEYCOMB STRUCTURAL BODY AND CATALYST COMPRISING THE SAME

BACKGROUND OF THE INVENTION

1. Field of the Invention

The present invention relates to a ceramic honeycomb structural body suitable for a catalyst carrier, wherein a number of flow channels having a polygonal cell-like cross-section and extending longitudinally through the honeycomb structural body are defined by a peripheral wall and partition walls arranged inside of the peripheral wall.

The present invention also relates to a ceramic honeycomb catalyst comprising such a honeycomb structural body and a catalytic substance carried thereon.

2. Description of the Related Art

The ceramic honeycomb structural body having the above-mentioned arrangement is widely used, for example, as a catalyst carrier in an exhaust gas cleaning system for automobiles. Use of ceramic honeycomb structural bodies as catalyst carriers has been wide spread due to low pressure loss during passage of the exhaust gas as a result of an high open frontal area, and an excellent exhaust gas clarifying performance. In this connection, an advanced ceramic honeycomb structural body which has been put into practical use has, for example, a partition wall thickness of 0.170 mm and a cell density of 60 cells per 1 $cm^2$.

In accordance with a recent enhancement in the exhaust gas regulation as related to environmental problems, e.g., a requirement for reduction in the total emission amount of hydrocarbon in the LA-4 mode which is one of exhaust gas evaluation test modes in the United States, there is a strong demand for an improved ceramic honeycomb structural body which is capable of achieving a distinguished exhaust gas clarifying performance as compared to conventional honeycomb structural bodies. Specifically, in an operational state immediately after starting an engine, i.e., in the so-called cold start state, the exhaust gas clarifying efficiency undergoes a considerable deterioration because the catalyst is still relatively cold and hence it is not sufficiently activated. Thus, an early activation of the catalyst during the cold start state is considered as the most important task to clear the exhaust gas regulation.

From such a viewpoint, as a general discussion, it has been proposed to reduce the thickness of the partition walls of the ceramic honeycomb structural body. The thin-walled ceramic honeycomb structural body serves on one hand to increase the open frontal area and thereby decrease the pressure loss and reduce the structure weight, and on the other hand to decrease the heat capacity of the catalyst and enhance the temperature elevation speed of the catalyst. In this case, a large geometric surface area of the honeycomb structural body can be obtained so that it is also possible to realize a compact structure. However, the thin-walled ceramic honeycomb structure requires a careful handling because it is generally difficult to achieve a predetermined minimum guarantee value for the isostatic destruction strength as one index of the structural strength. Thus, damage of the catalyst carrier may be caused during installation operation, that is so-called "canning" for mounting the honeycomb structural body in a catalyst converter casing so as to prevent movement of the honeycomb structural body due to vibration and the like in a practical use condition. In this connection, a typical canning method is to hold the honeycomb structural body from the outer peripheral surface thereof, though there may be instances wherein the honeycomb structural body is held either solely in the flow passage direction, or from the outer peripheral surface and also in the flow passage direction. Therefore, it is generally considered necessary for the above-mentioned minimum guarantee value to be no less than 5 $kgf/cm^2$, preferably no less than 10 $kgf/cm^2$ in terms of isostatic destruction strength. Conventionally, reduction of the partition walls in the ceramic honeycomb structure and achievement of sufficient isostatic destruction strength have been recognized as problems of antinomy with each other, and there has not been known any ceramic honeycomb structure having a partition wall thickness of less than 0.170 mm, which can be put into practical use in a reliable and satisfactory manner.

DISCLOSURE OF THE INVENTION

Therefore, it is one object of the present invention to provide a thin-walled ceramic honeycomb structural body having a preferable open frontal area and a sufficient isostatic destruction strength despite the thin partition walls, on the basis of a novel and unique conception with which all the above-mentioned problems can be eliminated at the same time.

Another object of the present invention is to provide an improved ceramic honeycomb catalyst having a reduced heat capacity provided by a thin-walled ceramic honeycomb structural body with a sufficient isostatic destruction strength despite the thin partition walls.

According to the present invention, there is provided a ceramic honeycomb structural body comprising an outer peripheral wall having a thickness of at least 0.1 mm, preferably 0.15 mm or more, and partition walls arranged inside of the peripheral wall and having a thickness (t) within a range of 0.050 mm and 0.150 mm, a number of flow channels being defined by the peripheral wall and the partition walls and arranged adjacent to each other with the partition walls between neighboring flow passages, the flow passages having a polygonal cell-like cross-section and extending longitudinally through the honeycomb structural body, the honeycomb structural body comprising a ceramic material having a true specific gravity and a porosity and satisfying at least one of the following formulae (1) and (2):

$$0.65 \leq OFA \leq -0.58 \times t + 0.98 \tag{1}$$

$$k \times \{1-(-0.58 \times t + 0.98)\} \leq G \leq k \times 0.35 \tag{2}$$

wherein OFA and G are an open frontal area and a bulk density of the honeycomb structural body, respectively, and k is a factor representing said true specific gravity multiplied by (1−porosity). The honeycomb structural body has an A-axis compressive strength of no less than 50 $kgf/cm^2$ and a B-axis compressive strength of no less than 5 $kgf/cm^2$, preferably 10 $kgf/cm^2$ or more.

The present invention also provides an improved ceramic honeycomb catalyst comprising a catalyst carrier formed of a ceramic honeycomb structural body, and a catalytic substance carried by the honeycomb structural body, wherein the ceramic honeycomb structural body includes all the above-mentioned novel features of the present invention. The catalyst according to the present invention has a heat capacity of no more than 450 kJ/K per unit volume of 1 $m^3$ of the catalyst, preferably no more than 410 kJ/K per 1 $m^3$.

The "A-axis compressive strength", the "B-axis compressive strength" and the "isostatic strength" as used herein are indices of the compressive strength all defined in the JASO standard M505-87, an automobile standard issued by Corporation of Automobile Technology Association. Thus, the A-axis compressive strength refers to a destruction strength when a compressive load is applied in the flow passage direction of the honeycomb structure, i.e., in the direction perpendicular to the cross-section of the honeycomb structure. The B-axis compressive strength is defined as a destruction strength when a compressive load is applied in the direction parallel to the cross-section of the honeycomb structure and perpendicular to the partition walls. Further, the isostatic strength refers to a compressive destruction strength when an isostatic, namely isotropic hydrostatic load is applied to the honeycomb structure, and is represented by a pressure value when the destruction occurs.

The A-axis compressive strength is not significantly affected by disorders of the honeycomb structure, such as deformation degree of the partition wall and the like, but has a strong correlation with the material strength since the compressive load is applied in the flow passage direction. In contrast thereto, although the B-axis compressive strength depends on the material strength, it is more strongly affected by disorders of the honeycomb structure such as a deformation degree of the partition wall. This applies to the isostatic strength as well, so that any one of the isostatic strength and the B-axis compressive strength serves as an index of the strength characteristic of the structure. However, the B-axis compressive strength is measured in a state in which there is no peripheral wall, and is therefore free from any influence of the peripheral wall structure.

Needless to say, the peripheral wall exhibits a function as an outer shell to protect the inner honeycomb structure from an external pressure and to withstand load during the canning at its outer peripheral surface. The peripheral wall bears an important role in this respect, because its destruction in many cases results in the partition walls adjacent to the peripheral wall receiving an abnormal load to start a chain of local destructions. In this connection, when the extrusion molding property of the honeycomb structural body is also taken into consideration, it is preferable for the peripheral wall thickness to be no less than 0.15 mm.

There is no clear correlation between the isostatic strength and the B-axis compressive strength, since the load application state is different and the generated stress distribution, too, is different. However, there is such a tendency that the higher the B-axis compressive strength, the higher the isostatic strength.

As described above, the A-axis compressive strength and the B-axis compressive strength are basic indices of the strength characteristic of the honeycomb structure, in that the A-axis compressive strength mainly indicates the influence on the part of the material strength and the B-axis compressive strength indicates the influence on the part of the honeycomb structure. The isostatic strength, in turn, indicates the practical structural strength characteristic and is expressed as a result of mutual interrelation of the influences of the material, the honeycomb structure, and the peripheral wall structure represented by the peripheral wall thickness.

According to the present invention, the partition walls of the ceramic honeycomb structural body as the catalyst carrier for the ceramic honeycomb catalyst are constituted as the thin walls as compared with those already known in the prior art. It is therefore possible not only to increase the open frontal area and reduce the pressure loss, but also to reduce the heat capacity of the honeycomb structure as the catalyst carrier and hence that of the catalyst itself. It is of course that the smaller the heat capacity of the catalyst, the faster the catalyst temperature elevates in the cold start state, thereby allowing the catalyst to be activated earlier so as to achieve an improved exhaust gas clarification performance. According to the present invention, furthermore, the above-mentioned predetermined conditions as expressed by the formulae (1) and/or (2) are satisfied between the thickness of the partition walls and the open frontal area and/or bulk density of the honeycomb structure, so that it is possible to realize practically satisfactory compressive strength characteristics of the honeycomb structural body notwithstanding the thin-walled constitution.

The constitution of the ceramic honeycomb structural body having the above-mentioned basic features according to the present invention is particularly advantageous from a practical viewpoint, when the thickness t of the partition walls is no more than 0.124 mm, when the open frontal area OFA is no less than 0.70 or when the bulk density G no more than k×0.30, due to the following reasons. Namely, when the honeycomb structure having the wall thickness t of no more than 0.124 mm is used as the catalyst carrier, a particularly distinguished exhaust gas clarification performance can be achieved while realizing practically satisfactory compressive strength characteristics. In addition thereto, when the open frontal area of the honeycomb structure is no less than 0.70 on the lower limit side or the bulk density G of the honeycomb structure is no more than k×0.30 on the upper limit side, then it becomes possible to realize the satisfactory compressive strength characteristics while realizing an excellent pressure loss characteristic and the distinguished exhaust gas clarification performance. Further, since the weight of the honeycomb structural body is reduced, when it is used as the catalyst carrier in exhaust gas clarification systems for automobiles, it is possible to reduce the vehicle body weight of the automobile and hence improve the fuel consumption characteristic.

BRIEF DESCRIPTION OF THE DRAWINGS

The present invention will be further explained in detail hereinafter with reference to the accompanying drawings, in which:

FIG. 1 is a perspective view showing the entire arrangement of the ceramic honeycomb structural body according to one embodiment of the present invention;

FIG. 2 is a schematic view showing one example of the flow passages and the partition walls in the ceramic honeycomb structural body according to the present invention;

FIG. 3 is a graph showing the relationship between the open frontal area and the partition wall thickness of the ceramic honeycomb structural body;

FIG. 4 is a graph showing the relationship between the bulk density and the partition wall thickness of the ceramic honeycomb structural body;

FIG. 5 is a graph showing the relationship between the open frontal area and the deformation degree of the peripheral wall;

FIGS. 6A and 6B are explanatory views showing the mode of transfer of the honeycomb structural body immediately after it has been extruded, and occurrence of the local deformation of the partition wall during the transfer.

FIG. 12 is a graph showing the engine output characteristic measured with the testing apparatus of FIG. 11;

FIG. 13A is a diagram showing the vehicle speed pattern based on the LA-4 mode as a representative example of the vehicle running test mode;

FIG. 13B is a detailed diagram showing the vehicle speed pattern during the initial 505 seconds in the LA-4 mode;

FIG. 14 is a graph showing the accumulated hydrocarbon discharge amount during the initial 505 seconds in the LA-4 mode;

FIG. 15 is a graph showing the relationship between the hydrocarbon discharge amount during the initial 505 seconds in the LA-4 mode and the partition wall thickness of the honeycomb structural body;

FIG. 16 is a graph showing the relationship between the hydrocarbon discharge amount and the catalyst heat capacity of the honeycomb structural body;

FIG. 17 is a graph showing the relationship between the clarification efficiency and the heat capacity of the honeycomb structural body for various exhaust gas components;

FIG. 18 is a graph showing the temperature change of various honeycomb structural bodies during the initial 505 seconds in the LA-4 mode;

FIG. 20 is a diagram showing the definition of the center line of the partition wall in the honeycomb structural body;

FIGS. 21A, 21B and 21C are explanatory views showing various modes of the bend deformation of the partition wall in the honeycomb structural body, and the deformation amounts for such deformation modes;

FIG. 22 is a graph showing the relationship between the isostatic strength and the maximum bend deformation amount (length ratio $L_B/L_A$) of the partition wall;

FIG. 23 is a graph illustrating the occurrence frequency of the partition walls which have been subjected to the bend deformation in cross-section of a honeycomb structural body;

FIG. 24 is a graph showing the relationship between the isostatic strength and the proportion of the number of the partition walls having the length ratio $L_B/L_A$ which is within the range between 1.10 and 1.15, to the total number of the partition walls;

FIGS. 25A and 25B are explanatory views showing possible forms of the partition walls which have been subjected to the bend deformation;

FIG. 28 is a graph showing the relationship between the isostatic strength and the length ratio $L_{max}/L_{min}$ of the diagonal lines in the case of square cross-section of flow passages, with the partition wall thickness as the parameter;

FIG. 31 is a graph showing the relationship between the isostatic strength and the number of defective partition walls among the total partition walls, with the partition wall thickness as the parameter.

DESCRIPTION OF THE PREFERRED EMBODIMENTS

Figure 7:
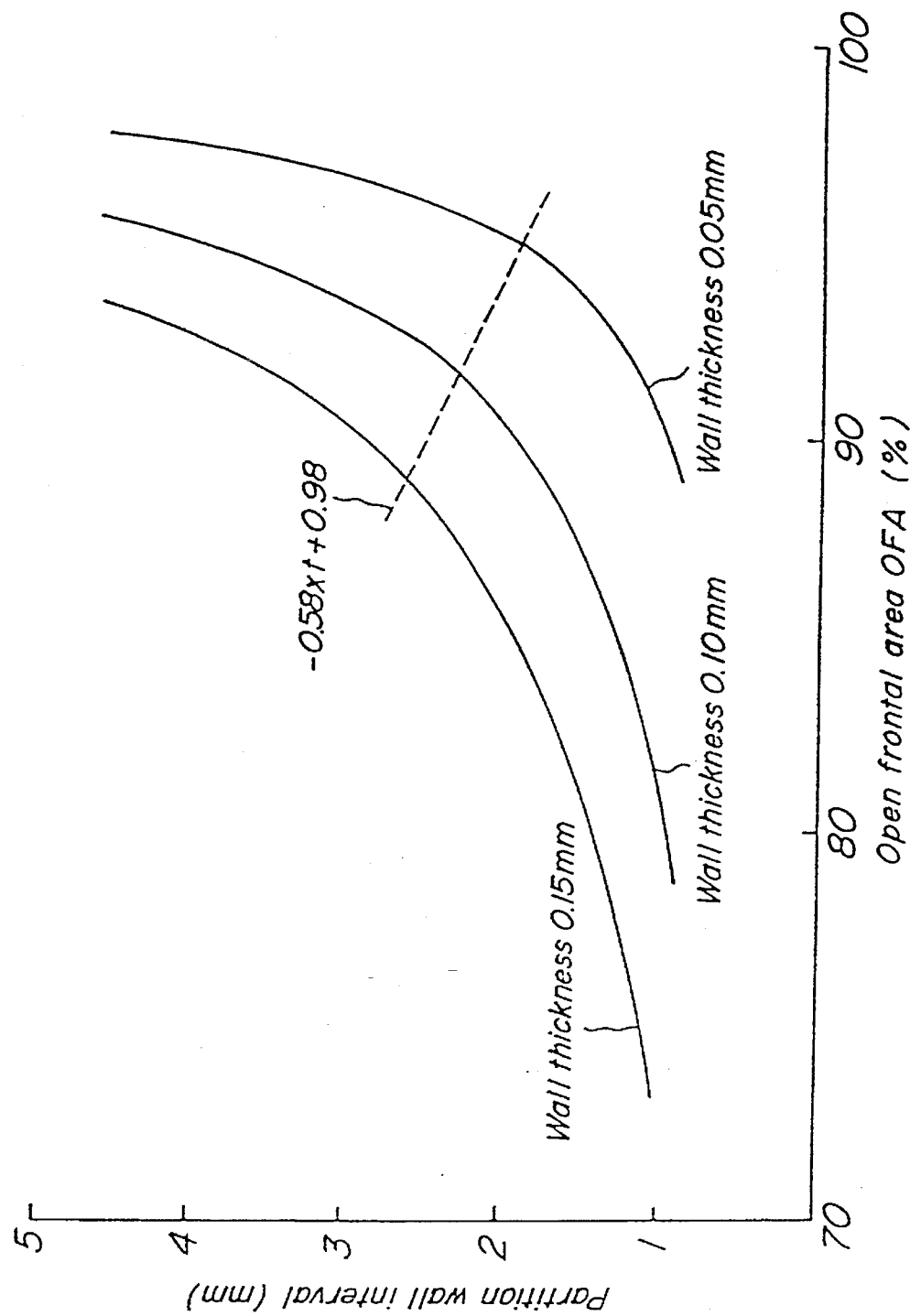
FIG. 7 is a graph showing the relationship between the interval of the partition walls and the open frontal area of the ceramic honeycomb structural body.

Referring now to FIG. 1, there is shown a ceramic honeycomb structural body according to one embodiment of the present invention, which is denoted as a whole by reference numeral 10. The honeycomb structural body 10 is provided with a peripheral wall 11 and partition walls 12 arranged inside thereof. The partition walls 12 define in the honeycomb structural body 10 a number of flow passages 13 in the form of cells of a polygonal cross-section, e.g., a triangular, square or hexagonal cross-section. These flow passages 13 extend longitudinally through the honeycomb structural body 10, for passing therethrough a fluid, such as an exhaust gas of an .internal combustion engine. The honeycomb structural body 10 may be round or circular in a cross-section perpendicular to the flow passage direction, as shown in FIG. 1. Alternatively, the honeycomb structural body 10 may have a different cross-sectional shape, e.g., an oval cross-section with elongated circular or elliptic contour, or other non-circular cross-section. Honeycomb structural bodies with such cross-sectional shapes, per se, are known and practically used. Moreover, the honeycomb structural body 10 has a longitudinal axis extending in the direction of the flow passages 13, which may be either straight or bent in a conventional manner known, per se.

The honeycomb structural body 10 according to the present invention can be suitably used, e.g., as a catalyst carrier in exhaust gas clarification systems for automobiles. The honeycomb structural body 10 may be an integrally extruded body consisting essentially of cordierite, mullite, alumina, silicon carbide, silicon nitride or zirconia. Advantageously, however, when the spalling resistance characteristic is also taken into account, the honeycomb structural body 10 is an integrally extruded body consisting essentially of cordierite and having flow channels 13 of square cross-section.

According to the present invention, when the honeycomb structural body 10 is used as a catalyst carrier, for example, the surface of the partition walls 12 is coated initially by a base material, such as γ-alumina or the like, by an amount of no less than 100 g/l with reference to a catalyst volume. Subsequently, a catalytic substance consisting essentially of at least one of noble metals among Pt, Rh and Pd is carried on the surface of the base material, by an amount of no less than 2 g/l with reference to the catalyst volume. In this case, the ceramic honeycomb catalyst comprising the honeycomb structural body 10 which has been coated with the base material and the catalytic substance, as described above, has a heat capacity which is no more than 450 kJ/K, preferably no more than 410 kJ/K, per 1 m³ of the catalyst.

In accordance with the present invention, the ceramic honeycomb structural body 10 has an A-axis compressive strength which is no less than 50 kgf/cm², and a B-axis compressive strength which is no less than 5 kgf/cm², preferably no less than 10 kgf/cm². The thickness of the peripheral wall 11 of the honeycomb structural body 10 is at least 0.1 mm, and the thickness t (FIG. 2) of the partition walls 12 is within a range between 0.050 mm and 0.150 mm. According to the present invention, furthermore, the open frontal area OFA and the bulk density G of the honeycomb structural body 10 satisfy the following formulae (1) and (2), respectively:

$$0.65 \leq OFA \leq -0.58 \times t + 0.98 \quad (1)$$

$$k \times \{1-(-0.58 \times t+0.98)\} \leq G \leq k \times 0.35 \quad (2)$$

where k is a factor representing the true specific gravity of the ceramic material forming the honeycomb structural body 10, multiplied by (1−material porosity).

As known in the art, the open frontal area OFA and the bulk density G of the honeycomb structural body 10 have a complementary relationship with each other so that, if either one of them has been determined, the other can be determined by itself when the true specific gravity and the porosity of the material are known.

The present invention is to define the particular relationships between the partition wall thickness t and the the open frontal area OFA and between the partition wall thickness t and the bulk density G as shown in FIGS. 3 and 4, respectively, wherein the formulae (1) and (2) are satisfied in the hatched regions. The upper limit value (−0.58×t+0.98) of the open frontal area OFA in the formula (1) is an approximate expression based on a result of investigations as shown in FIG. 5 in which the relationship between the open frontal area and the local deformations of the peripheral walls of various samples was investigated with the partition wall thickness t as the parameter, and the acceptability of these samples was judged according to the deformation degree.

Namely, honeycomb structural bodies immediately after they have been extruded are conveyed to a subsequent step while being temporarily supported on a pedestal with their outer peripheral surfaces in abutment with a substantially horizontal supporting surface of the pedestal, as shown in FIG. 6A. During such transfer, the honeycomb structural body is still soft and may thus be subjected to a local deformation at the peripheral wall, as shown in FIG. 6B. With such a local deformation at the peripheral wall of the honeycomb structural body, deviated contact of the honeycomb structure may occur during the canning, or the partition walls in the vicinity of the locally deformed region of the peripheral wall may undergo a successive deformation, thereby enhancing the probability of decrease in the isostatic strength and/or breakage of the honeycomb structure.

Therefore, the acceptability of the honeycomb structural body has been judged taking into account the deformation degree of the peripheral wall in relation to the open frontal area OFA of the honeycomb structure. As known in the art, an increase in the open frontal area OFA results in decreased cell density, a decreased number of partition walls forming the honeycomb structure and increased intervals (cell pitch) of the partition walls supporting the circumferential wall. The relationship between the open frontal area OFA and the partition wall interval in the honeycomb structure is shown in FIG. 7. It can be clearly appreciated from FIG. 7 that, for any partition wall thickness, the partition wall interval rapidly increases at a certain open frontal area. Further investigations have been conducted on the relationship between the open frontal area OFA and the partition wall thickness t. As a result, it has been confirmed that the peripheral wall supported between the partition walls tends to deflect when the open frontal area OFA exceeds −0.58× t+0.98. It has been also confirmed that such deflection of the peripheral wall enhances the tendency of the local deformation of the peripheral wall and successive deformation of adjacent partition walls supporting the peripheral wall, thereby significantly decreasing the isostatic strength of the honeycomb structural body. If the partition walls and the peripheral walls have ideally accurate shapes without deformations, application of an isostatic load causes a compressive stress field to prevail in the honeycomb structure. However, occurrence of the local deformations may give rise to generation of tensile stresses at the deformed regions, and the isostatic strength is then governed by the tensile stress and caused to decrease rapidly.

Distinguished functional characteristics of the ceramic honeycomb structural body 10 and the ceramic honeycomb catalyst in accordance with the present invention, both satisfying the above-mentioned conditions, will be further explained hereinafter on the basis of various experimental results.

Figure 8:
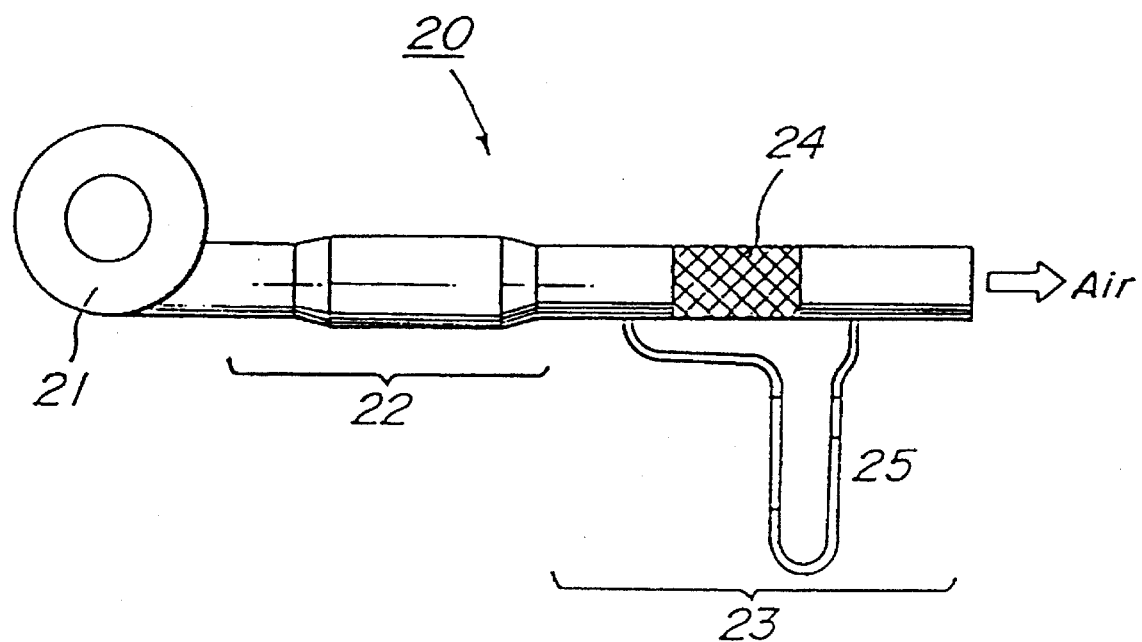
FIG. 8 is a diagram showing the measuring system for the pressure loss characteristic of the ceramic honeycomb structural body.

At the outset, an investigation has been conducted to ascertain the relationship between the pressure loss characteristic and the open frontal area of the ceramic honeycomb structural body 10 according to the present invention. FIG. 8 shows a measuring system 20 used for the measurement of the pressure loss characteristic of the honeycomb structural body. The measuring system 20 includes an air blower 21, a flow straightening section 22 and a measuring section 23. Measurement with such a measuring system 20 has been carried out by arranging within the measuring section 23 an object whose pressure loss is to be measured, i.e., a honeycomb structural body 24, operating the blower 21 so that pressurized air is fed through the flow straightening section 22 and passed through the flow channels of the honeycomb structural body 24, and measuring the pressure loss across the honeycomb structural body 24, i.e., the pressure difference between the upstream and downstream sides of the honeycomb structural body 24, by means of a manometer 25 which is in connection with the measuring section 23. Measurement of the pressure loss characteristic by means of the measuring system 20 has been carried out with respect to a series of ceramic honeycomb structural bodies each having a constant size (cross-section and volume) and a different open frontal area, by changing the air flow rate.

Figure 9:
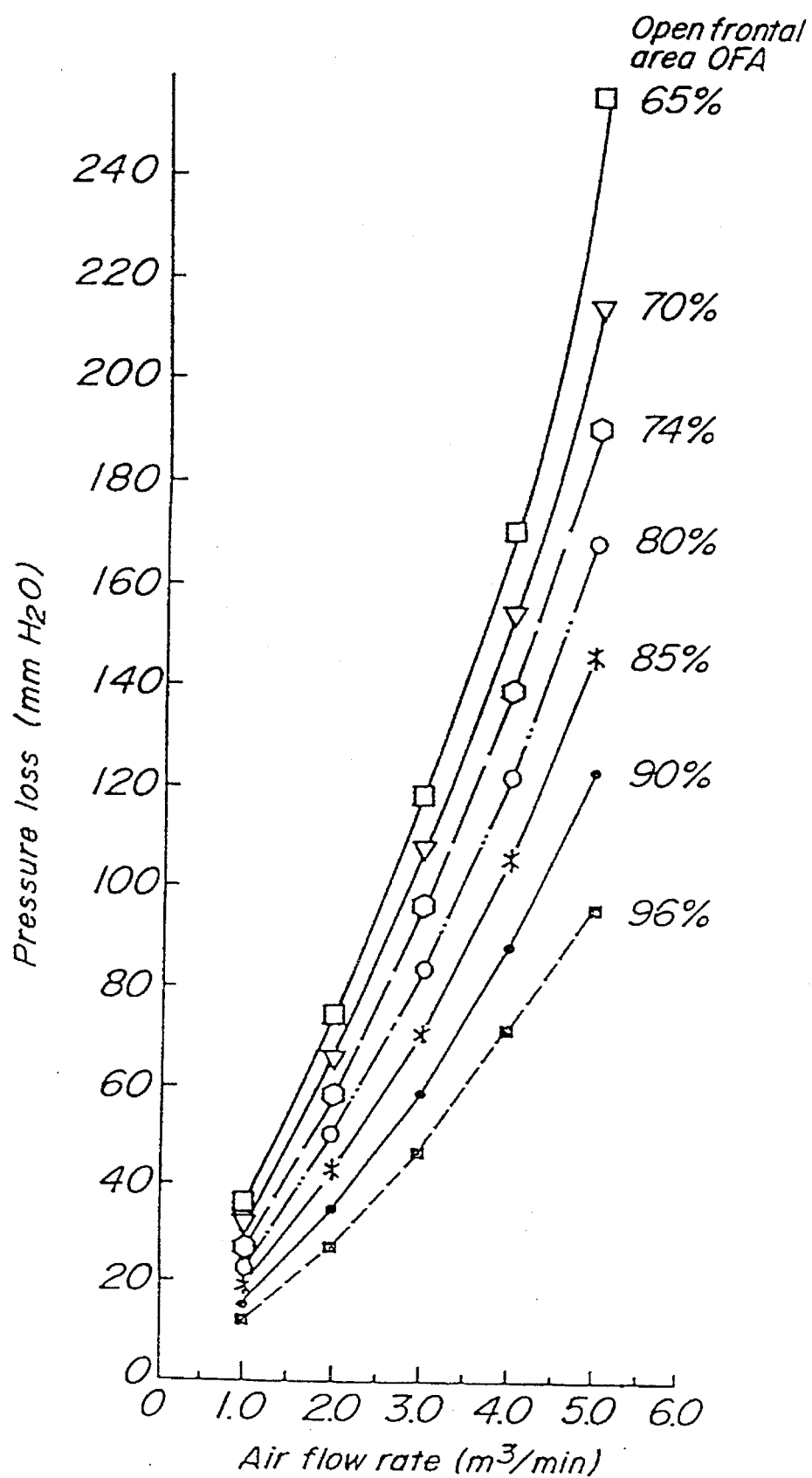
FIG. 9 is a graph showing the pressure loss characteristic measured by the system of FIG. 8.
Figure 10:
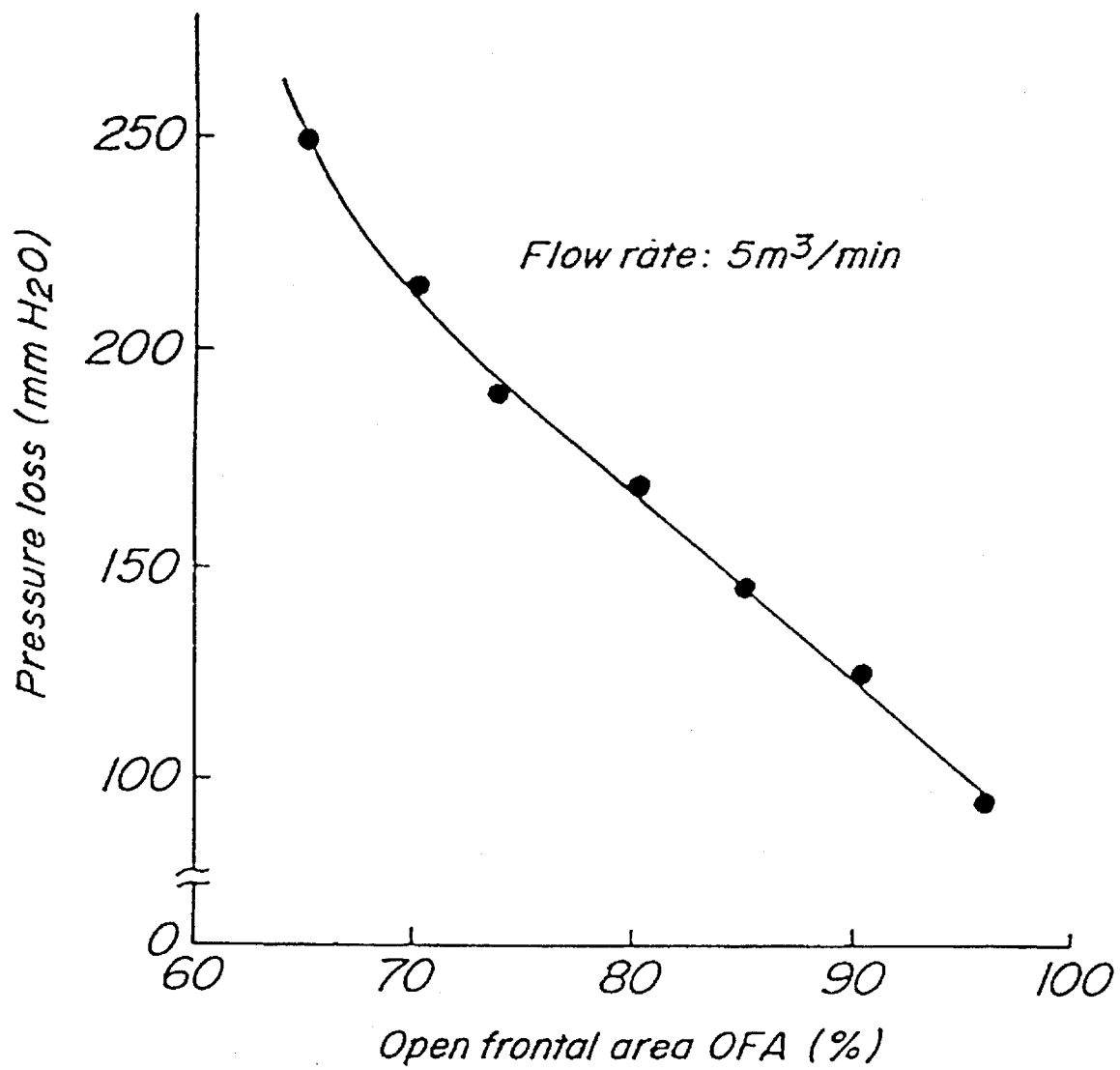
FIG. 10 is a graph showing the change in the pressure loss in accordance with the change in the open frontal area, measured by the system of FIG. 8 with the air flow amount maintained constant.

The measurement of the pressure loss characteristic of the series of honeycomb structural bodies resulted in the data shown in FIG. 9, from which it can be clearly appreciated that the pressure loss increases with a decrease in the open frontal area OFA. FIG. 10 further shows the change in the pressure loss of the same series of the honeycomb structural bodies, expressed in relation to change in the open frontal area OFA with the air flow amount maintained constant (5 m³/min). It can be appreciated from FIG. 10 that an incremental tendency of the pressure loss with reference to decrease in the open frontal area OFA becomes remarkable at an open frontal area of no more than 70%, particularly no more than 65%. This reveals the desirability for the lower limit value of the open frontal area to be 65% (=0.65), preferably 70% (=0.70).

Figure 11:
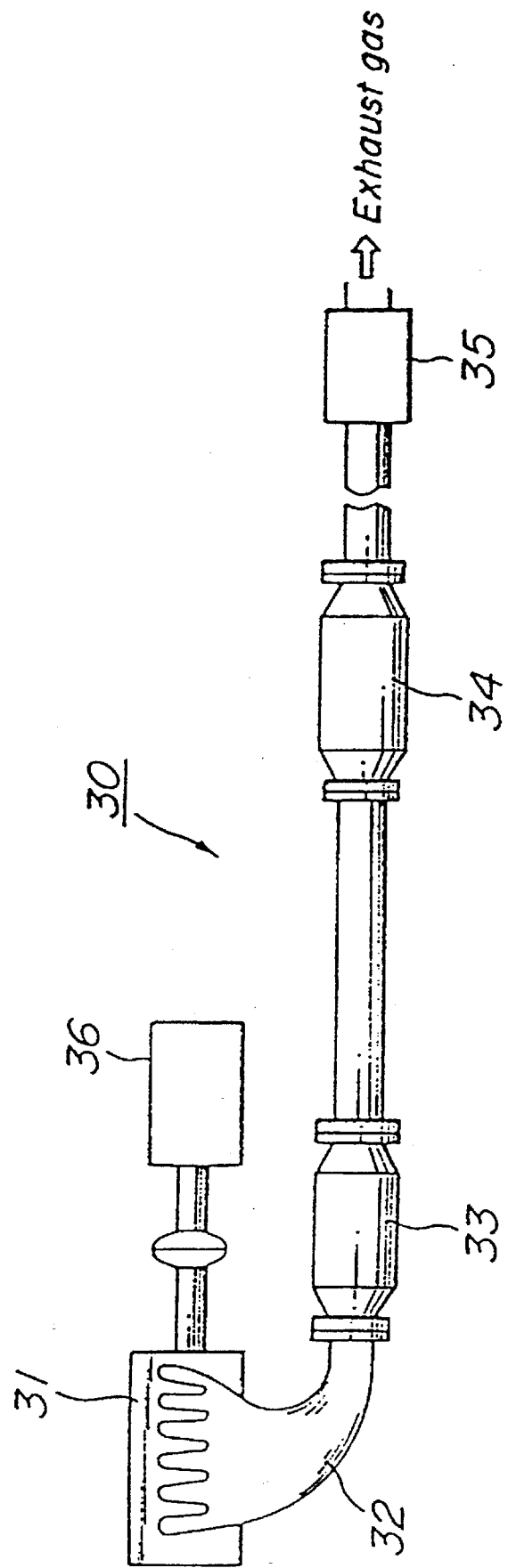
FIG. 11 is a diagram showing the testing system for the honeycomb structural body using an actual engine.

Next, explanation will be made of the output characteristic of internal combustion engines as influenced by the ceramic honeycomb structural body 10 in accordance with the present invention, in particular the open frontal area OFA thereof. FIG. 11 shows a testing apparatus 30 used for measuring the output of an actual internal combustion engine 31, which is comprised of a 6-cylinder gasoline engine having a displacement of 3000 cc, and is followed by an exhaust manifold 32 having a length of 50 cm. A converter 33 equipped with a honeycomb structural body (measurement object), is arranged on the immediate downstream side of the exhaust manifold 32. An underfloor converter 34 having a volume of 1700 cc and a muffler 35 are connected on the downstream side of the converter 33. A dynamometers 36 is connected to the output shaft of the engine 31. Using this testing system 30, the engine output at the maximum output state of the engine 31 was measured by the dynamometer 36. The measurement was conducted with respect to a group of converters 33 on the immediate downstream side of the exhaust manifold 32, which were equipped with respective catalyst carriers constituted by ceramic honeycomb structural bodies having a constant size (volume 1700 cc) and different open frontal area. The result of such measurement is shown in FIG. 12 from which it can be appreciated that a decremental tendency of the engine output with decrease in the open frontal area of the ceramic honeycomb structural body becomes remarkable at an open frontal area of less than 70%, particularly less than 65%.

Further explanation will be made hereinafter, with reference to exhaust gas clarifying performance achieved by an exhaust gas clarification system for automobiles which is provided with a ceramic honeycomb catalyst including the ceramic honeycomb structural body 10 according to the present invention.

As known in the art, it is a general practice to perform the exhaust gas measurement of actual vehicles in an operational state in accordance with a predetermined vehicle speed pattern which is defined by a particular test driving mode. As a representative example of such test driving mode, FIG. 13A shows a diagram of the vehicle speed pattern of the LA-4 mode, and FIG. 13B shows the detailed vehicle speed pattern during the initial 505 seconds in the LA-4 mode.

A test vehicle with a 6-cylinder gasoline engine having a displacement of 2500 cc was used to perform the exhaust gas measurement in an operational state in accordance with the vehicle speed pattern of the LA-4 mode, with respect to a series of catalytic converters sequentially connected on the immediate downstream side of the exhaust manifold of the exhaust gas system. These converters include respective ceramic honeycomb catalyst carriers each being of same size or volume and cell density, i.e., 1200 cc and 60 cells/cm$^2$, and a different partition wall thickness. For each such converter, accumulated discharge amount of hydrocarbon (HC) was measured during the initial 505 seconds of the LA-4 mode. The data obtained by such measurement is shown in FIG. 14 from which it can be appreciated that a reduction in the partition wall thickness results in decreased discharge amount of hydrocarbon.

FIG. 15 shows the discharge amount of hydrocarbon during the initial 505 seconds in the LA-4 mode, the data of which has been obtained with respect to the same series of converters as mentioned above. It can be appreciated from FIG. 15 that a reduced partition wall thickness results in a decreased hydrocarbon emission amount, and such a decremental tendency becomes remarkable at a partition wall thickness of no more than 0.124 mm.

Further investigation has been conducted to ascertain the relationship between the discharge amount of hydrocarbon and the heat capacity of the catalyst. The data obtained by such investigation is shown in FIG. 16 from which it can be appreciated that a reduction in the heat capacity results in a decreased hydrocarbon emission amount, and such a decremental tendency becomes remarkable at a heat capacity of no more than 450 kJ/m$^3$, preferably no more than 410 kJ/m$^3$.

Still further investigation has been conducted to ascertain the relationship between the heat capacity of the catalyst and the clarification efficiency for each emission component (NOx, CO, HC) until the so called "Bag A2 peak" is reached. The data obtained by such investigation is shown in FIG. 17 from which it can be appreciated that a reduced heat capacity results in an increased cleaning efficiency for each emission component, and such an incremental tendency also becomes remarkable at a heat capacity of no more than 450 kJ/m$^3$, preferably no more than 410 kJ/m$^3$.

As known in the art, the performance of the exhaust gas clarification system for automobiles in the cold start state is primarily determined by the quality of the temperature elevation characteristic of the catalyst carrier itself, and the clarification performance can be improved by a reduced bulk density of the catalyst carrier, hence by a reduced heat capacity of the catalyst. Thus, the temperature of the catalyst carrier during the initial 505 seconds in the LA-4 mode was measured using a test vehicle with a 6-cylinder gasoline engine having a displacement of 2500 cc, with respect to a series of catalytic converters sequentially connected on the immediate downstream side of the exhaust manifold of the exhaust gas system. In this case also, each converter includes a ceramic honeycomb catalyst carrier of same size or volume and cell density, i.e., 1200 cc and 60 cells/cm$^2$, and a different partition wall thickness. The temperature of each catalyst carrier was measured at a central portion of the carrier, which is spaced 15 mm from the exhaust gas inlet side. The data obtained by such measurement is shown in FIG. 18 from which it can be appreciated that a reduced partition wall thickness and hence a reduced bulk density of the catalyst carrier results in improvement in the temperature elevation characteristic of the carrier. It can be further recognized from FIG. 18 that metal honeycomb catalyst has a relatively low temperature elevation rate than ceramic honeycomb catalyst. This is considered to result from the fact that metal has a higher heat conductivity than ceramics and thus provides a higher amount of heat dissipation during the temperature elevation process than ceramics.

Figure 19:
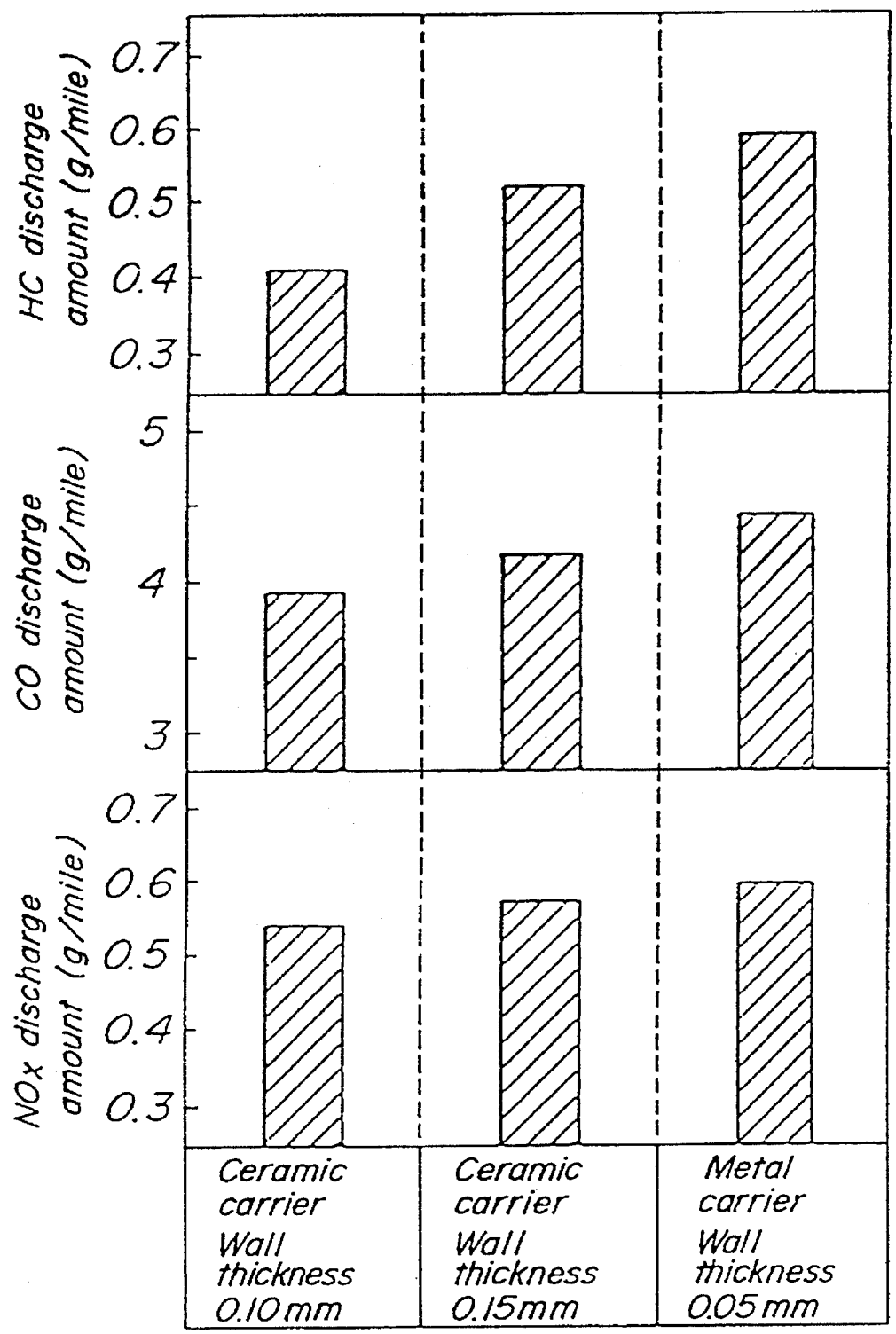
FIG. 19 is a graph showing the discharge amounts of various exhaust gas components during the initial 505 seconds in the LA-4 mode.

Furthermore, the amounts of various emission components (NOx, CO, HC) emitted during the initial 505 seconds in the LA-4 mode were measured using a test vehicle with a 6-cylinder gasoline engine having a displacement of 2500 cc, with respect to a series of honeycomb catalytic converters sequentially connected on the immediate downstream side of the exhaust manifold of the exhaust gas system. These converters were equipped with ceramic honeycomb catalyst carriers and a metal honeycomb catalyst carrier, respectively. The data obtained by such measurement is shown by the bar graph in FIG. 19 from which it can be appreciated that the ceramic honeycomb catalyst carriers are superior in the exhaust gas clarification performance than the metal honeycomb catalyst carrier.

As described above, the ceramic honeycomb structural body 10 according to the present invention has an A-axis compressive strength of no less than 50 kgf/cm$^2$ and a B-axis compressive strength of no less than 5 kgf/cm$^2$. The inventors conducted thorough investigations and experiments, aiming at improvement in the compressive strength characteristics of the ceramic honeycomb structural body. As a result, it has been confirmed that deformation or defects which may occur in the partition walls during the production stage of the honeycomb structural body significantly causes the compressive strength to decrease. The inventors further reached a recognition that, in order to realize an excellent compressive strength characteristics notwithstanding a thin-walled structure of the ceramic honeycomb structural body, it is of particular importance to maintain the degree of the deformation of the partition walls and discontinuity or the like defects within quantitatively predetermined ranges, respectively.

First of all, explanation will be made of a bend deformation of the partition walls as one mode of possible deformation thereof. There may be instances wherein bend deformation occurs, e.g., at the inside of a ceramic honeycomb structural body, though the bend deformation tends to occur more frequently at a region of a partition wall in the vicinity of its junction to the peripheral wall. The bend deformation can be recognized, e.g., as a bend or curvature of the partition walls by observing the honeycomb structural body from the flow passage direction.

With reference to a unit partition wall, i.e., that portion of a partition wall which forms an arbitrary flow passage in the honeycomb structural body and which may have been subjected to a bend deformation into an arcuate shape, for example, it is particularly convenient to define the center line of the unit partition wall so as to enable a quantitative evaluation of the degree of the bend deformation. Specifically, as shown in FIG. 20, the center line of the unit partition wall can be defined as a line which passes through centers of circles inscribing both sides of that partition wall. Between any two pints on such center line which are spaced from each other by a linear distance $L_A$, the center line has an actual length $L_B$ which is always greater than the distance $L_A$ when the partition wall has been subjected to the bend deformation. Thus, the degree of the bend deformation can be expressed in terms of the length ratio $L_B/L_A$ as exemplified in FIG. 21A. The two points on the center line for calculating the length ratio LB/LA are selected such that the length ratio $L_B/L_A$ becomes maximum. As for the configuration of the bend deformation, besides a deformation into an arcuate shape wherein the partition wall is bent over the entire length, there are also instances wherein the center line of the partition wall is comprised of two straight line segments joined to each other at an angle, or the partition wall is bent only locally, as shown in FIG. 21B and FIG. 21C, respectively.

According to the present invention, for substantially all the partition walls in the honeycomb structure, it is advantageous to maintain the length ratio $L_B/L_A$ within a range between 1 and 1.10, and to ensure that the number of the partition walls having the length ratio $L_B/L_A$ within a range between 1.10 and 1.15 is no more than 1% of the total number of the partition walls.

FIG. 22 is a graph showing the relationship between the isostatic strength and the deformation amount, i.e., the maximum value of the length ratio $L_B/L_A$ in the partition walls of one ceramic honeycomb structural body. Before performing an isostatic destruction test, the length ratio $L_B/L_A$ was measured in advance, with respect to each partition wall which had been subjected to a large deformation and therefore predicted to become a destruction point. The isostatic destruction test was then performed with respect to a series of honeycomb structural bodies which are different in the partition wall thickness, so as to investigate the relationship between the isostatic strength and the length ratio $L_B/L_A$ of the partition wall at the destruction point. Each honeycomb structural body subjected to such isostatic destruction test is of a standard size having a round shape with an outer diameter of approximately 100 mm. In FIG. 22, the curve on the upper side shows the data for a relatively thick partition wall and the curve on the lower side shows the data for a relatively thin partition wall. It has been revealed by such investigations that the isostatic strength tends to rapidly increase when the length ratio $L_B/L_A$ decreases to 1.10 or less.

FIG. 23 is a graph showing the dispersion, in a statistical sense, of the length ratio $L_B/L_A$ assumed by those partition walls in arbitrary cross-section of one honeycomb structural body, which had been subjected to bending deformation. This graph schematically shows the frequency of various length ratio $L_B/L_A$ assumed by such deformed partition walls. It is apparent that the frequency in question is dependent on the length ratio $L_B/L_A$ of such partition walls. There are of course ceramic honeycomb structural bodies wherein all the partition walls have the length ratio $L_B/L_A$ of 1.10 or less, and also ceramic honeycomb structural bodies which include partition walls having the length ratio $L_B/L_A$ in excess of 1.10.

FIG. 24 is a graph showing the relationship between the isostatic strength and the proportion (N'/N)×100% in quantity occupied by the number N' of the deformed partition walls each having a length ratio $L_B/_A$ which is within a range between 1.10 and 1.15, with reference to the total number N of the partition walls. In FIG. 24, the curve on the upper side shows the data for a relatively thick partition wall, and the curve on the lower side shows the data for a relatively thin partition wall. It can be appreciated from this graph that the isostatic strength tends to rapidly increase when the above-mentioned quantity proportion decreases to 1.0% or less.

The reasons for such a tendency of the isostatic strength may be explained as follows. That is to say, an increased quantity proportion of the deformed partition walls often results in a higher probability of the occurrence of clusters wherein two or more deformed partition walls are located in succession as shown in FIG. 25A. In this instance, considerably deformed partition walls may be situated adjacent to each other. The honeycomb structural body with the above-mentioned clusters of the deformed partition walls is in clear contrast in terms of the local structural strength, with the honeycomb structural body wherein deformed partition walls are dispersed with an intervening distance from each other as shown in FIG. 25B. That is to say, when the deformed partition walls are clustered, the cell-like flow channels tend to be more readily crushed and the structural strength tends to decrease. Furthermore, in the case of an isostatic destruction test with respect to the honeycomb structural body wherein the deformed partition walls are clustered, the regions of the honeycomb structural body having a decreased strength become the destruction points to lower the isostatic strength as well.

It has been confirmed that, when the above-mentioned quantity proportion of the deformed partition walls exceeds 1.0%, the clusters of such deformed partition walls tend to be formed with a higher probability, thereby lowering the isostatic strength. On the contrary, when the quantity proportion of the deformed partition walls is 1.0% or less, the clusters of such deformed partition walls tend to be formed with a lower probability, and this results in a dispersion of the deformed partition walls to provide a higher local structural strength and hence a higher isostatic strength.

Figure 26:
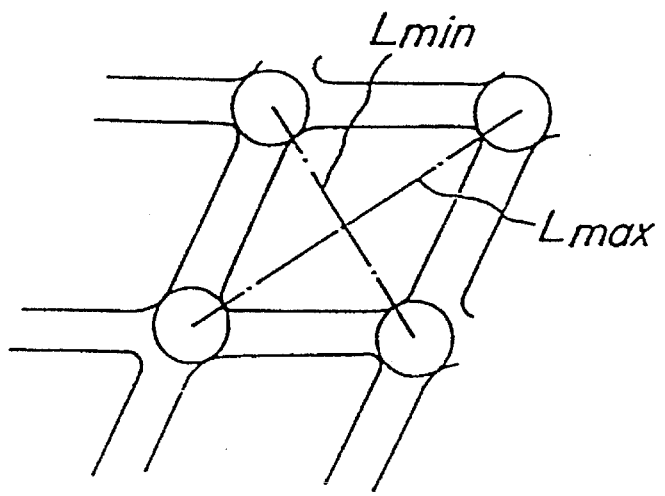
FIG. 26 is an explanatory view showing the crushed deformation amount of the partition walls of the honeycomb structural body having flow passages of square cross-section.

In the next place, explanation will be made of a crush deformation of the partition walls as another mode of possible deformation thereof. As distinguished from the above-mentioned bend deformation of the partition walls, the crush deformation occurs as a change in the intersection angle between adjacent unit partition walls forming a cell-like flow passage. Thus, for example, in the case of flow passages with a square cross-section, the crush deformation occurs as transformation of a rhombic cross-section of the flow passage. In this case, as shown in FIG. 26, any flow passage in the honeycomb structural body may be deemed to have lattice points each defined by a center of the maximum inscribed circle inscribing at least three corners at an intersection of adjacent unit partition walls. Then, with reference to diagonal lines connecting opposite pairs of such lattice points, respectively, the degree of the crush deformation of the partition walls can be conveniently quantified by a length ratio $L_{max}/L_{min}$ of the maximum diagonal line length $L_{max}$ to the minimum diagonal line length $L_{min}$.

Figure 27A:
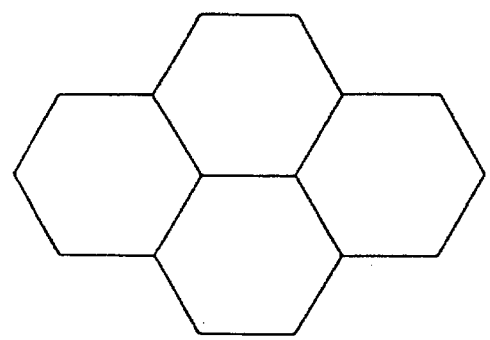
FIGS. 27A and 27B are explanatory views respectively showing the states before and after the crushed deformation of the partition walls of the honeycomb structural body having flow passages of hexagonal cross-section.
Figure 27B:
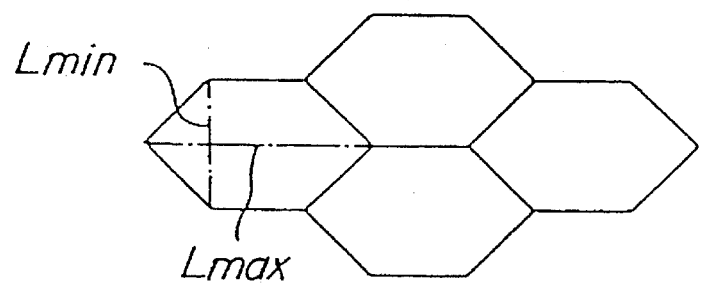
Figure 29:
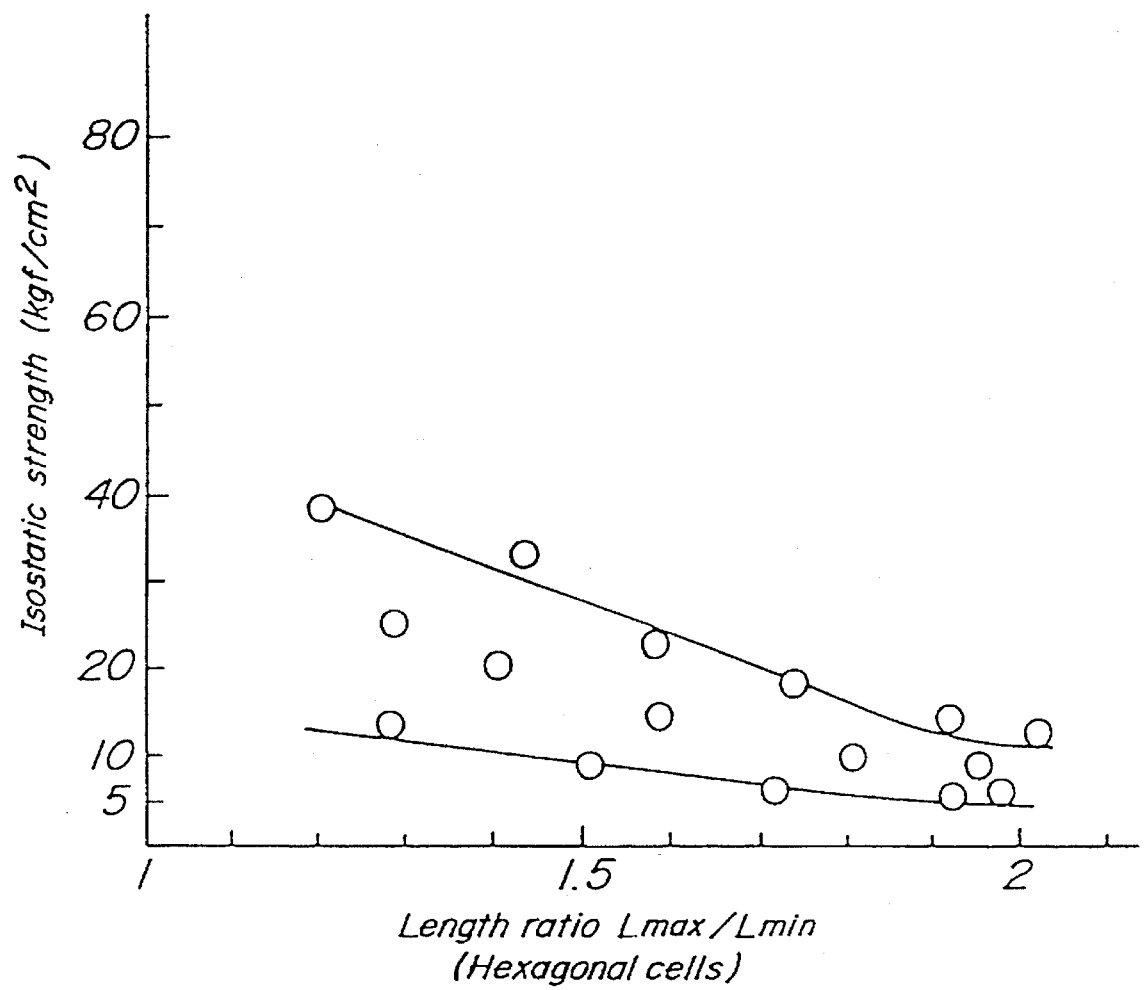
FIG. 29 is a graph showing the relationship between the isostatic strength and the length ratio $L_{max}/L_{min}$ of the diagonal lines in the case of hexagonal cross-section of flow passages, with the partition wall thickness as the parameter.

Advantageously, the above-mentioned length ratio $L_{max}/L_{min}$ is within a range between 1 and 1.73 in the case of square cross-section of the flow passages shown in FIG. 26, and within a range between 1.15 and 1.93 in the case of hexagonal cross-section of the flow passages shown in FIG. 27A and FIG. 27B. Graphs shown in FIG. 28 and FIG. 29 illustrate the relationship of the length ratio $L_{max}/L_{min}$ and the isostatic strength with reference to square cross-section and hexagonal cross-section of the flow passages, respectively, with the partition wall thickness as a parameter. In FIG. 28 and FIG. 29, the curves on the upper sides show the data for relatively thick partition walls, and the curves on the lower sides show the data for relatively thin partition walls, respectively. It can be appreciated from these graphs that the isostatic strength rapidly tends to rapidly increase when the length ratio $L_{max}/L_{min}$ is reduced to 1.73 or less in the case of square cross-section of the flow passage, or reduced to 1.93 or less in the case of hexagonal cross-section of the flow passage.

Figures 30A, 30B:
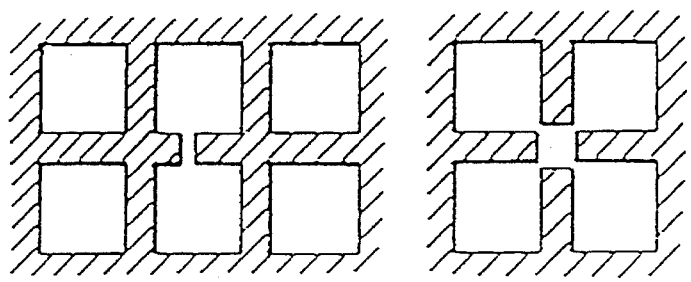
FIGS. 30A and 30B are explanatory views showing the defective states of the partition walls in the honeycomb structural body having a square cross-section of flow passages.

Besides the above-mentioned bend and crush deformations of the partition walls, the isostatic strength of the honeycomb structural body also tends to decrease when a gap is formed in any cross-section of the honeycomb structural body, due to a discontinuity of the partition wall in the flow passage direction. There are shown in FIG. 30A and FIG. 30B the shapes of the partition walls with such a discontinuity as observed in the flow passage direction. The discontinuity of the partition wall may occur at a position between the lattice points or at the lattice points, and the number of lacks in both cases is counted to be 1.

According to the present invention, the number $N_{DT}$ of the partition walls having a discontinuity in the flow passage direction to form a gap in any cross-section of the honeycomb structural body is advantageously no more than 1.0% of the total number N of the partition walls in the honeycomb structural body. Furthermore, with reference to an outer peripheral region of the honeycomb structural body including inner 20th flow passages as counted from the outermost periphery of the honeycomb structural body, the number $N_{D20}$ of the partition walls included in that region and having a discontinuity in the flow passage direction to form a gap in any cross-section of the honeycomb structural body is advantageously no more than 0.5% of the total number N of the partition walls in the honeycomb structural body.

Figure 32:
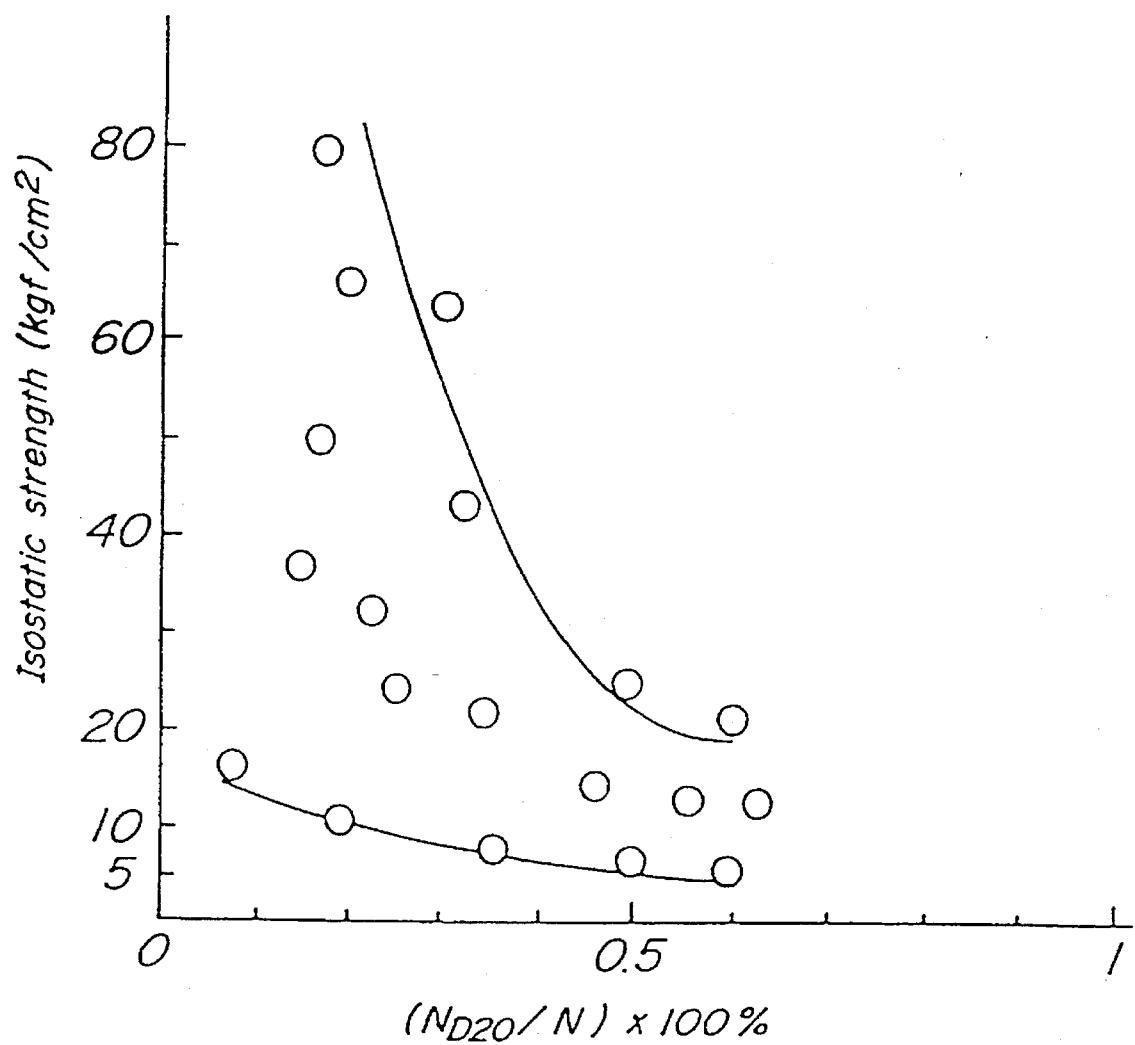
FIG. 32 is a graph showing the relationship between the isostatic strength and the number of defective partition walls in the outer peripheral region, with the partition wall thickness as the parameter.

FIG. 31 and FIG. 32 are graphs showing the relationship between the isostatic strength and the number $N_D$, $N_{D20}$ of the partition walls having a discontinuity, respectively, with the partition wall thickness as the parameter. In FIG. 31 and FIG. 32, the curves on the upper sides show the data for relatively thick partition walls, and the curves on the lower sides show the data for relatively thin partition walls, respectively. It can be appreciated from FIG. 31 that the isostatic strength rapidly tends to rapidly increase when the proportion $(N_{DT}/N) \times 100\%$ occupied by the number $N_D$ of the discontinuous partition walls with respect to the total number N of the partition walls in the honeycomb structural body as a whole is reduced to 1.0% or less. Further investigations were conducted to ascertain the relationship between the isostatic strength and the location of the discontinuity of the partition walls, taking into consideration the number of the partition walls included in the above-mentioned outer peripheral region of the honeycomb structural body and having a discontinuity in the flow passage direction. As can be appreciated from FIG. 32, such investigation reveals that the isostatic strength tends to rapidly increase when the proportion $(N_{D20}/N) \times 100\%$ occupied by the number $N_{D20}$ of the discontinuous partition walls in the outer peripheral region of the honeycomb structural body with respect to the total number N of the partition walls in the honeycomb structural body as a whole is reduced to 0.5% or less.

It should be noted that all the data of the isostatic strength explained above with reference to the drawings are those obtained from the honeycomb structural body having the cell-like flow passages of a square cross-section and a round outer shape. However, it is also possible to achieve essentially same functions and advantages by honeycomb structural bodies having flow passages of triangular or hexagonal cross-section and by honeycomb structural bodies of oval outer shape, provided that the above-mentioned conditions of the present invention are satisfied.

It will be appreciated from the foregoing detailed description that the present invention a thin-walled ceramic honeycomb structural body with a reduced partition wall thickness as compared with that of the prior art structure, making it possible to realize an increased open frontal area and a reduced pressure loss, and to thereby decrease the heat capacity of the honeycomb structural body when it is used as the catalyst carrier. According to the present invention, furthermore, it is also possible to provide a ceramic honeycomb structural body having practically satisfactory compressive strength characteristics notwithstanding the thin-walled structure, by satisfying the particular relationships between the partition wall thickness and the open frontal area and/or bulk density of the ceramic honeycomb structural body, and quantitatively maintaining the specifically defined ranges of the degree of deformation and the number of discontinuity or the like defects, which may occur in the partition walls in the production stage of the ceramic honeycomb structural body.

While the present invention has been described with reference to certain preferred embodiments, they were given by way of examples only. It is of course apparent that various changes and modifications may be made without departing from the scope of the present invention as defined by the appended claims.

We claim:

1. A ceramic honeycomb structural body comprising:

an outer peripheral wall having a thickness of at least 0.1 mm;

a plurality of partition walls arranged inside of the peripheral wall and each having a thickness, t, ranging from 0.050 mm to 0.150 mm; and a plurality of flow channels defined by said peripheral wall and said partition walls, and arranged adjacent to each other with said partition walls between neighboring flow passages, said flow passages having a polygonal cell cross-section and extending longitudinally through said honeycomb structural body;

wherein said honeycomb structural body (i) comprises a ceramic material having a true specific gravity and a porosity; (ii) satisfies at least one of the following formulae (1) and (2):

$$0.65 \leq OFA \leq -0.58 \times t + 0.98 \quad (1)$$

$$k \times \{1-(-0.58 \times t + 0.98)\} \leq G \leq k \times 0.35 \quad (2)$$

wherein OFA and G are an open frontal area and a bulk density of the honeycomb structural body, respectively, said open frontal area being equal to the open frontal area of the flow channels divided by the frontal area of the honeycomb structural body, and k is a factor representing said true specific gravity multiplied by (1-porosity); and (iii) has an A-axis compressive strength of no less than 50 kgf/cm$^2$ and a B-axis compressive strength of no less than 5 kgf/cm$^2$.

2. The ceramic honeycomb structural body according to claim 1 and satisfying formula (1), wherein the thickness of each said partition wall is no more than 0.124 mm and the open frontal area of the honeycomb structural body is no less than 0.70.

3. The ceramic honeycomb structural body according to claim 1 and satisfying formula (2), wherein the thickness of each said partition wall is no more than 0.124 mm and the bulk density G of the honeycomb structural body is no less than k×0.30.

4. The ceramic honeycomb structural body according to claim 1, wherein each said partition wall in the cross-section of the honeycomb structural body has opposite sides and a center line passing through centers of circles inscribing both sides of the partition wall, and wherein a center line length ($L_B$) measured between any two points along said center line has a ratio to a linear distance ($L_A$) between said two points, said ratio ($L_B/L_A$) being within a range between 1 and 1.10.

5. The ceramic honeycomb structural body according to claim 1, wherein each of said partition wall in the cross-section of the honeycomb structural body has opposite sides and a center line passing through centers of circles inscribing both sides of the partition wall, and wherein the partition walls of a number which corresponds to no more than 1% of all the partition walls have a ratio ($L_B/L_A$) of a center line length ($L_B$) measured between any two points along said center line to a linear distance ($L_A$) between said two points, said ratio ($L_B/L_A$) being within a range between 1.10 and 1.15.

6. The ceramic honeycomb structural body according to claim 1, wherein each cell defining a flow passage in the cross-section of the honeycomb structural body has lattice points each defined by a center of the maximum inscribed circle inscribing at least three corners at intersections of adjacent partition walls, a first pair of opposite lattice points being connected by a first diagonal line of maximum length ($L_{max}$), and a second pair of opposite lattice points being connected by a second diagonal line of minimum length ($L_{min}$), said maximum length having a ratio ($L_{max}/L_{min}$) to said minimum length, which is within a range between 1 and 1.73 in the case of flow passages of a square cross-section, and within a range between 1.15 and 1.93 in the case of flow passages of a hexagonal cross-section.

7. The ceramic honeycomb structural body according to claim 1, wherein the partition walls of a number corresponding to no more than 1% of all the partition walls in the cross-section of the honeycomb structural body have defects which form cross-sectional gaps in said honeycomb structural body.

8. The ceramic honeycomb structural body according to claim 1, wherein said honeycomb structural body has an outer peripheral region including inner twentieth cells counted from an outermost periphery of the honeycomb structural body, the partition walls having defects which form cross-sectional gaps in said honeycomb structural body, and a number corresponding to no more than 0.5% of all the partition walls in the cross-section of the honeycomb structural body are included in said outer peripheral region.

9. The ceramic honeycomb structural body according to claim 1, wherein said body is formed by an integral extrusion molding process.

10. The ceramic honeycomb structural body according to claim 1, wherein said body is a catalyst carrier in an exhaust gas clarification system for internal combustion engines.

11. The ceramic honeycomb structural body according to claim 1, wherein the flow passages are of square cross-section, said honeycomb structural body comprising cordierite and being for a catalyst carrier in an exhaust gas clarification system for automobiles.

12. The ceramic honeycomb structural body according to claim 1, comprising at least one member selected from the group consisting of mullite, alumina, silicon carbide, silicon nitride and zirconia.

13. A ceramic honeycomb catalyst comprising a catalyst carrier formed of a ceramic honeycomb structural body, and a catalytic substance carried by said honeycomb structural body, said honeycomb structural body comprising:

an outer peripheral wall of a thickness of at least 0.1 mm;

a plurality of partition walls arranged inside of the peripheral wall and each having a thickness, t, ranging from 0.050 mm to 0.150 mm; and a plurality of flow channels defined by said peripheral wall and said partition walls, and arranged adjacent to each other with said partition walls between neighboring flow passages, said flow passages having a polygonal cell cross-section and extending longitudinally through said honeycomb structural body;

wherein said honeycomb structural body comprises (i) a ceramic material having a true specific gravity and a porosity; (ii) satisfies at least one of the following formulae (1) and (2):

$$0.65 \leq OFA \leq -0.58 \times t + 0.98 \quad (1)$$

$$k \times \{1-(-0.58 \times t + 0.98)\} \leq G \leq k \times 0.35 \quad (2)$$

wherein OFA and G are an open frontal area and a bulk density of the honeycomb structural body, respectively, said open frontal area being equal to the open frontal area of the flow channels divided by the frontal area of the honeycomb structural body, and k is a factor representing said true specific gravity multiplied by (1-porosity); and (iii) has an A-axis compressive strength of no less than 50 kgf/cm$^2$ and a B-axis compressive strength of no less than 5 kgf/cm$^2$; and said catalyst has a heat capacity of no more than 450 kJ/K per 1 m$^3$ of the catalyst.

14. The ceramic honeycomb catalyst according to claim 13, wherein said honeycomb structural body satisfies formula (1), the thickness of each partition wall being no more than 0.124 mm, and the open frontal area of the honeycomb structural body being no less than 0.70, and wherein the heat capacity of said catalyst is no more than 410 kJ/K per 1 m$^3$ of the catalyst.

15. The ceramic honeycomb catalyst according to claim 13, wherein said honeycomb structural body satisfies formula (2), the thickness of each partition wall being no more than 0.124 mm, and the bulk density of the honeycomb structural body being no less than k×0.30, and wherein the heat capacity of said catalyst is no more than 410 kJ/K per 1 $m^3$ of the catalyst.

16. The ceramic honeycomb catalyst according to claim 13, wherein each partition wall in the cross-section of the honeycomb structural body has opposite sides and a center line passing through centers of circles inscribing both sides of the partition wall, and wherein a center line length ($L_B$) measured between any two points along said center line has a ratio to a linear distance ($L_A$) between said two points, said ratio ($L_B/L_A$) being within a range between 1 and 1.10.

17. The ceramic honeycomb catalyst according to claim 13, wherein each said partition wall in the cross-section of the honeycomb structural body has opposite sides and a center line which is defined by a line passing through centers of circles inscribing both sides of the partition wall, and wherein the partition walls of a number which corresponds to no more than 1% of all the partition walls have a ratio ($L_B/L_A$) of a center line length ($L_B$) measured between any two points along said center line to a linear distance ($L_A$) between said two points, said ratio ($L_B/L_A$) being within a range between 1.10 and 1.15.

18. The ceramic honeycomb catalyst according to claim 13, wherein each cell defining a flow passage in the cross-section of the honeycomb structural body has lattice points each defined by a center of the maximum inscribed circle inscribing at least three corners at intersections on ends of each partition wall, a first pair of opposite lattice points being connected by a first diagonal line of the maximum length ($L_{max}$), and a second pair of opposite lattice points being connected by a second diagonal line of the minimum length ($L_{min}$), said maximum length having a ratio ($L_{max}/L_{min}$) to said minimum length, which is within a range between 1 and 1.73 in the case of flow passages of a square cross-section, and within a range between 1.15 and 1.93 in the case of flow passages of a hexagonal cross-section.

19. The ceramic honeycomb catalyst according to claim 1, wherein the partition walls of a number corresponding to no more than 1% of all the partition walls in the cross-section of the honeycomb structural body have defects which form cross-sectional gaps in said honeycomb structural body.

20. The ceramic honeycomb catalyst according to claim 13, wherein said honeycomb structural body has an outer peripheral region including inner twentieth cells counted from an outermost periphery of the honeycomb structural body, the partition walls having defects which form cross-sectional gaps in said honeycomb structural body, and a number corresponding to no more than 0.5% of all the partition walls in the cross-section of the honeycomb structural body are included in said outer peripheral region.

21. The ceramic honeycomb catalyst according to claim 13, wherein said honeycomb structural body is formed by an integral extrusion molding process.

22. The ceramic honeycomb catalyst according to claim 13, wherein said body is used in an exhaust gas clarification system for internal combustion engines.

23. The ceramic honeycomb catalyst according to claim 13, wherein the flow passages in the honeycomb structural body are of square cross-section, said honeycomb structural body comprising cordierite and said catalyst being for an exhaust gas clarification system for automobiles.

24. The ceramic honeycomb catalyst according to claim 1, wherein said honeycomb structural body comprises at least one member selected from the group consisting of mullite, alumina, silicon carbide, silicon nitride and zirconia.

* * * * *